United States Patent
Ays et al.

(10) Patent No.: US 11,966,215 B2
(45) Date of Patent: *Apr. 23, 2024

(54) SYSTEMS AND METHODS FOR ASSEMBLING STRUCTURAL COMPONENTS

(71) Applicant: House of Design LLC, Nampa, ID (US)

(72) Inventors: Sean E. Ays, Meridian, ID (US); Shane Christopher Dittrich, Nampa, ID (US); Mike Aaron Luna, Meridian, ID (US)

(73) Assignee: House of Design LLC, Nampa, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/984,930

(22) Filed: Nov. 10, 2022

(65) Prior Publication Data

US 2023/0176553 A1 Jun. 8, 2023

Related U.S. Application Data

(63) Continuation of application No. 16/586,558, filed on Sep. 27, 2019, now Pat. No. 11,520,318.

(60) Provisional application No. 62/856,569, filed on Jun. 3, 2019.

(51) Int. Cl.
| | | |
|---|---|---|
| G05B 19/00 | (2006.01) | |
| B25J 5/02 | (2006.01) | |
| B25J 11/00 | (2006.01) | |
| E04B 2/56 | (2006.01) | |
| E04C 3/02 | (2006.01) | |
| G05B 19/418 | (2006.01) | |

(52) U.S. Cl.
CPC .......... G05B 19/41865 (2013.01); B25J 5/02 (2013.01); B25J 11/005 (2013.01); E04B 2/56 (2013.01); E04C 3/02 (2013.01); *G05B 2219/45064* (2013.01); *G05B 2219/45205* (2013.01)

(58) Field of Classification Search
None
See application file for complete search history.

(56) References Cited

U.S. PATENT DOCUMENTS

| | | |
|---|---|---|
| 8,807,548 B2 | 8/2014 | Fredrickson et al. |
| 11,520,318 B2 * | 12/2022 | Ays .......................... E04B 2/56 |
| 2007/0256392 A1 | 11/2007 | Mifsud et al. |
| 2010/0057242 A1 | 3/2010 | Williams et al. |
| 2014/0121801 A1 | 5/2014 | Taguchi et al. |
| 2015/0267393 A1 | 9/2015 | Bovet |

(Continued)

OTHER PUBLICATIONS

Ingelstad, et al., "Robotic Assembly of Aircraft Engine Components Using a Closed-Loop Alignment Process", In: Procedia CIRP 23 (2014) 110-115; 2014 [online] [retrieved on Jul. 29, 2020 (Jul. 29, 2020)] Retrieved from the Internet < URL: https://www.sciencedirect.com/science/article/pii/S2212827114011275>.

(Continued)

*Primary Examiner* — Paul B Yanchus, III
(74) *Attorney, Agent, or Firm* — Foley & Lardner LLP

(57) ABSTRACT

Systems and methods for assembling structural components are disclosed. The systems and methods consider a sequence, operations of the sequence, and an approach vector in placing structural members (including structural members with pre-attached fasteners) for assembling structural components.

20 Claims, 17 Drawing Sheets

(56) References Cited

U.S. PATENT DOCUMENTS

| | | |
|---|---|---|
| 2015/0277432 A1 | 10/2015 | Ikeda et al. |
| 2017/0066092 A1 | 3/2017 | Yamamoto |
| 2018/0193172 A1 | 7/2018 | Smith et al. |
| 2018/0328034 A1 | 11/2018 | Cecchetto et al. |
| 2019/0094841 A1 | 3/2019 | Denayer et al. |

OTHER PUBLICATIONS

International Search Report and Written Opinion dated Aug. 14, 2020 for international application PCT/US2020/033717.
Foreign Search Report on EP dated May 9, 2023.
Homem-De-Mello LS: "Sequence Planning for Robotic Assembly of Tetrahedral Truss Structures", IEEE Transactions on Systems, Man and Cybernetics, IEEE, New York, US, vol. 25, No. 2, pp. 304-312, Feb. 1, 1995, XP000501493, ISSN: 0018-9472, DOI: 10.1109/21.364834.
Makris Sotiris et al: "Assembly support using AR technology based on automatic sequence generation", CIRP Annals, Elsevier Amsterdam, NL, vol. 62, No. 1, pp. 9-12, May 1, 2013, XP028565652, ISSN: 0007-8506, DOI: 10.1016/J.CIRP.2013.03.095.
Warren Liao T et al: "A Computer-Aided Aircraft Frame Assembly Planner", Computers in Industry, Elsevier, Amsterdam, NL, vol. 27, No. 3, pp. 259-271, Nov. 1, 1995, XP000539352, ISSN: 0166-3615, DOI: 10.1016/0166-3615(95)00042-X.

\* cited by examiner

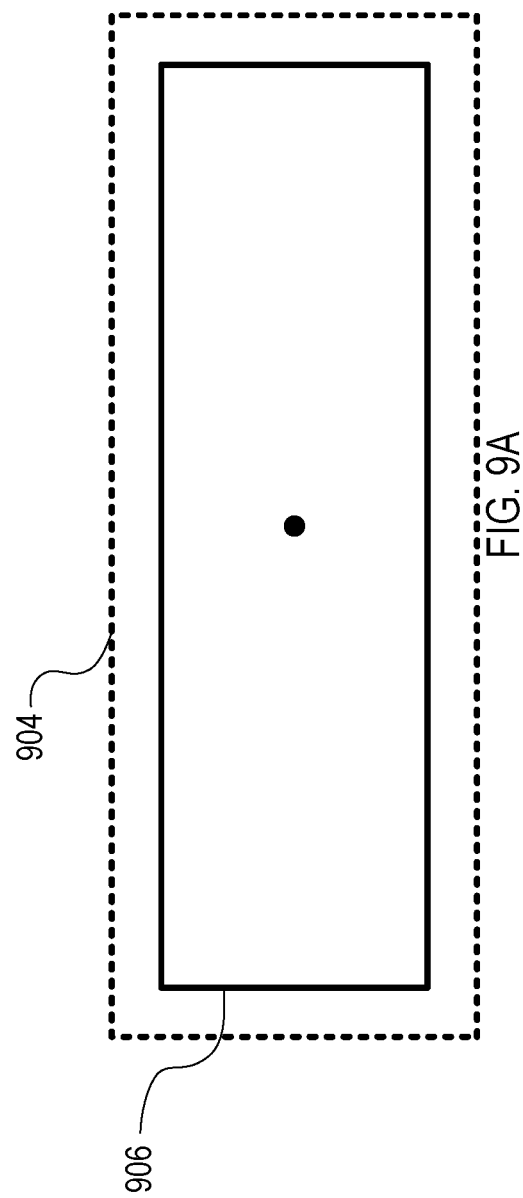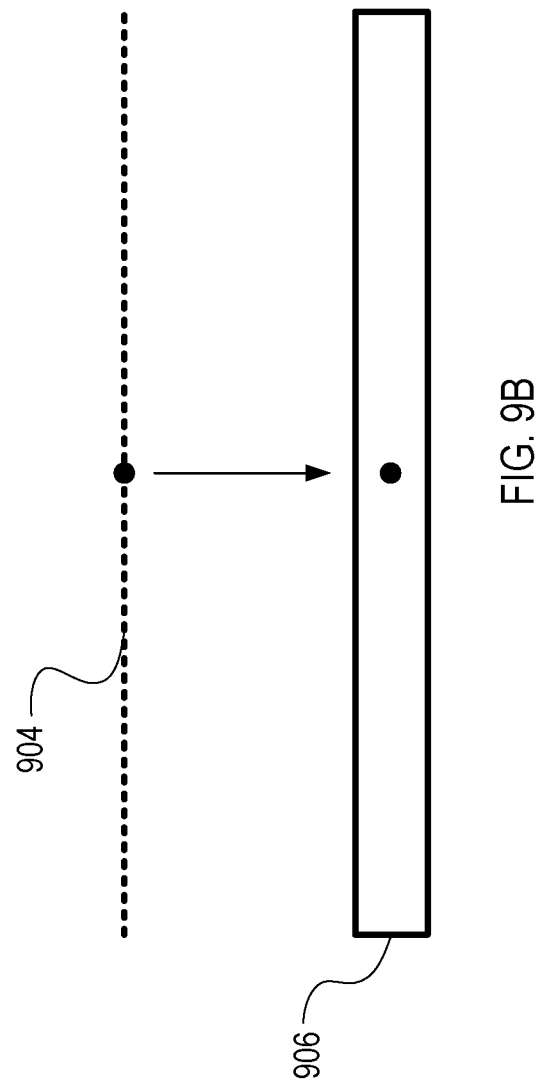

1100

[Load] [Start ▼] [Stop ⬡]

Ready

| Board | File | Graphic | EB1 | EB2 | Status | Source / Job-Job-Asmbly-Desc. | Length | Size | Grade |
|---|---|---|---|---|---|---|---|---|---|
| 1 | Saw Cut File 1 | | | | Infeed | Manual | 14 | 2x10 | No 2 |
| | | | | | Infeed | A000102-PATENTEXAMPLE-01 | 04:00:00 | 2x10 | No 2 |
| 2 | Saw Cut File 1 | | | | Infeed | Manual | 12 | 2x8 | No 2 |
| | | | | | Infeed | A000102-PATENTEXAMPLE-T1 | 03:00:00 | 2x8 | No 2 |
| 3 | Saw Cut File 1 | | | | Infeed | Manual | 12 | 2x4 | No 2 |
| | | | | | Infeed | A000102-PATENTEXAMPLE-T2 | 03:00:00 | 2x4 | No 2 |

FIG. 11

SYSTEMS AND METHODS FOR ASSEMBLING STRUCTURAL COMPONENTS

RELATED APPLICATIONS

This application is a continuation of U.S. patent application Ser. No. 16/586,558, titled SYSTEMS AND METHODS FOR ASSEMBLING STRUCTURAL COMPONENTS, filed Sep. 27, 2019, which claims the benefit under 35 U.S.C. § 119(e) of U.S. Provisional Application No. 62/856,569, titled SYSTEMS AND METHODS FOR ASSEMBLING STRUCTURAL COMPONENTS, filed Jun. 3, 2019, each of which are hereby incorporated by reference herein in their entirety.

TECHNICAL FIELD

The present disclosure relates generally to the field of assembling structural components, and more particularly to systems and methods for pre-fabricating structural components, such as a truss, a frame, etc., for building construction.

BACKGROUND

Pre-fabrication of structural components, such as trusses, can save significant time at a construction site and improve efficiency and expedite completion of a construction project. Automated pre-fabrication of structural components is presently limited because of challenges in manipulating and joining structural members (e.g., boards) to an appropriate position for joining together.

BRIEF SUMMARY

The present disclosure provides embodiments of computer-implemented systems and methods of automating pre-fabrication of structural components.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

FIGS. 9A-9E illustrate using an approach vector during member placement, according to some embodiments.

FIG. 11 illustrates a GUI that may be displayed to a user demonstrating the generated instruction for a member shaping device.

DETAILED DESCRIPTION

Figure 1:
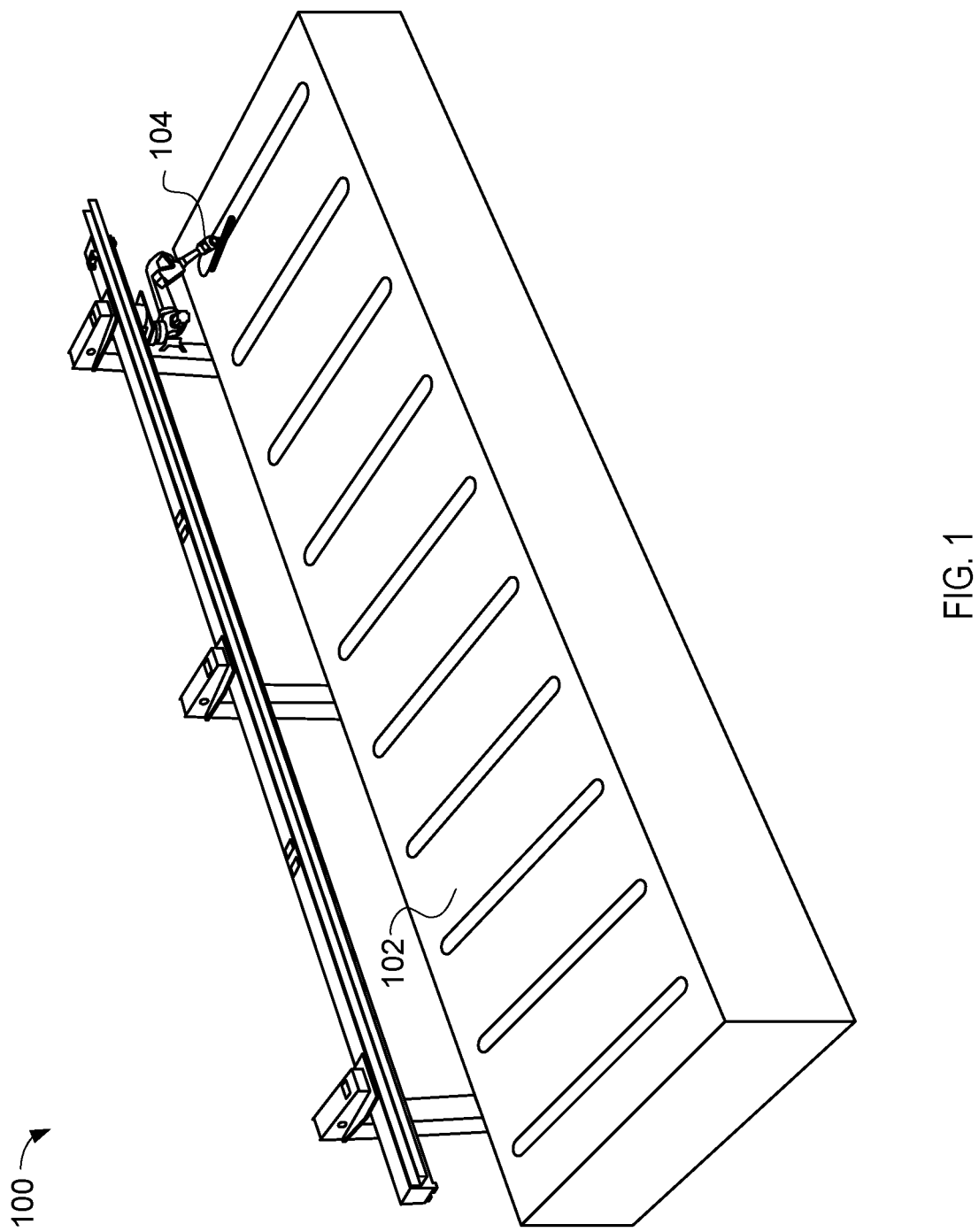
FIG. 1 is a perspective view of an assembly station of an assembly system, comprising a assembly table and a robotic arm, according to one embodiment of the present disclosure.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Structural components, such as wall frames, partition frames, trusses, etc., are often assembled at a factory. Factory assembly provides a number of advantages, including consistency of product and speed and/or efficiency of production. Conversely, factory assembly is sometimes less than ideal for custom products, which may require additional time and manpower to manually configure an assembly table, manually place some or all of the structural component members, and manually apply some or all of the fasteners. Also, custom, or one-off structural components may lack a consistency of quality relative to non-custom products. An industry practice to reduce quality variations may include limiting non-mass production to a particular set of semi-custom structural components so that individual variations are eliminated and opportunities for human error are reduced. Fixtures which can be selectively configured, such as those disclosed herein, may also reduce quality variations while enabling a greater degree of customization.

A structural component may include one or more members. A member may be, for example, a board or a beam, and may be made of wood or metal, among other options. Further, a member may be two or more boards (or beams, or other pieces of material) that have been spliced together (e.g., to form a long member out of two or more shorter pieces of material). A member may include a number of vertices defining locations where two or more edges of a member meet. A member may have any number of vertices. The edges of the member may be straight or of some other shape, and may or may not be perpendicular to each other. A member may be beveled. Non-limiting examples of members include wooden boards and metal beams. It is contemplated that these or any other type of member may be used in a structural component as defined herein.

One or more members of a structural component may be capable of engaging with one or more fasteners. Fasteners may be used to connect two or more members together. For example, a fastener may be a nail plate configured to fasten two or more wooden boards together. A fastener may be fastened to a member on an outer surface of a member. In order to fasten together two or more members, a fastener may first be fastened to a first member and subsequently fastened to a second (or third, or fourth) member. Throughout the specification, the relationship between a member and fastener that has been positioned against, but not actually attached to, that member will be referred to as a potential fastening, which may later be finalized (meaning that the fastening at that position between the fastener and the member actually occurs). Throughout this specification, the location at which two or more members interact (or will interact) with at least one fastener (including before the fastening with the fastener has been finalized) will be referred to as a joint.

FIG. 1 is a perspective view of an assembly station 100 of an assembly system, comprising a assembly table 102 and a robotic arm 104, according to one embodiment. The robotic arm 104 may be capable of retrieving a member to be used in a structural component. This retrieval may occur as the member finishes being shaped, finishes being attached to fasteners, or otherwise modified (e.g., the robotic arm 104 may retrieve a wooden board after the wooden board has been cut by a saw and/or after one or more nail plates have been attached to the wooden board). The robotic arm may include one or more features capable of engaging with the member in order to retrieve it, such as a vacuum suction feature, a claw or pincher feature, and/or a piercing feature. The robotic arm 104 may further be capable of placing the member on the assembly table 102 in a position specified by data received at the assembly station. This placement activity may be repeated across multiple members (up to the number of members needed to make up a completed structural component). Once the member is placed, any fastener attached to the member may be on the "bottom" of a member (as the assembly table 102 is viewed from above) or alternatively may be on the "top" of a member (again, as the assembly table 102 is viewed from above). Note that similar nomenclature may relatedly be used to describe a fastener's relationship to an entire structural component.

This placement activity may be facilitated by one or more pins of the assembly table 102. These pins may rise above the top surface of the assembly table 102. In some embodiments, the placement of these pins relative to the surface of the assembly table 102 is adjustable. The pins of the assembly table 102 may be adjusted such that they are properly positioned to act as jig stops for one or more members that has been (or will be) placed on the surface of the assembly table 102 by the robotic arm 104. In other words, the placement of a member flush against two or more of the pins acting as jig stops may confirm that at least the surface of the member that is flush against the two or more pins is in the correct position along at least one axis following the surface of the assembly table 102. The use of two or more additional pins along, e.g., a second surface of the member may further confirm that the member is in the proper position as to the planar surface of the assembly table 102. Pins used in this manner may help in the accurate positioning of at least the initial members of a structural component being assembled by the assembly station 100. In some embodiments, it may be that the pins of the table can be programmed to adjust their positions without direct human intervention. These pins may be attached to an assembly included in the assembly table 102 that can programmatically be moved along a slot in the assembly table 102, thereby causing the pin to travel along the slot.

In embodiments herein, an assembly station may be instructed to automatically move one or more pins of the assembly table 102 to act as a jig stop for one or more members being placed by a robotic arm. The locations of the pins may accordingly be adjusted to account for the proper location of a member being placed. The robotic arm 104 may then use these pins as part of the member placement activity. For example, the robotic arm 104 may be programmed to come in at an approach vector (discussed below) relative to these pins in order to ensure that the placement of the member is indeed flush against these pins.

During placement activity at the assembly station 100, a member may be placed next to an already-placed member and may intersect with a portion of a fastener that is already attached to the already-placed member to create a potential fastening. Alternatively (or additionally), a member with an attached fastener may be placed such that the attached fastener also intersects with a portion of an already-placed member to create a potential fastening. The assembly station 100 may further be capable of finalizing these potential fastenings. This may occur via, e.g., a roller, a gantry press, or other mechanism that traverses all or a portion of the placed members to thereby press the members and fasteners together.

In FIG. 1, an assembly surface is illustrated as a surface of the assembly table 102. A wide variety of assembly surfaces could be used with embodiments herein, including an assembly surfaces that is instead vertical or angled (relative to the plane followed by the surface of the assembly table 102). These other assembly surfaces may include, but are not limited to, assembly surfaces defined by two or more beams of a vertical structural component assembly apparatus.

Figure 2:
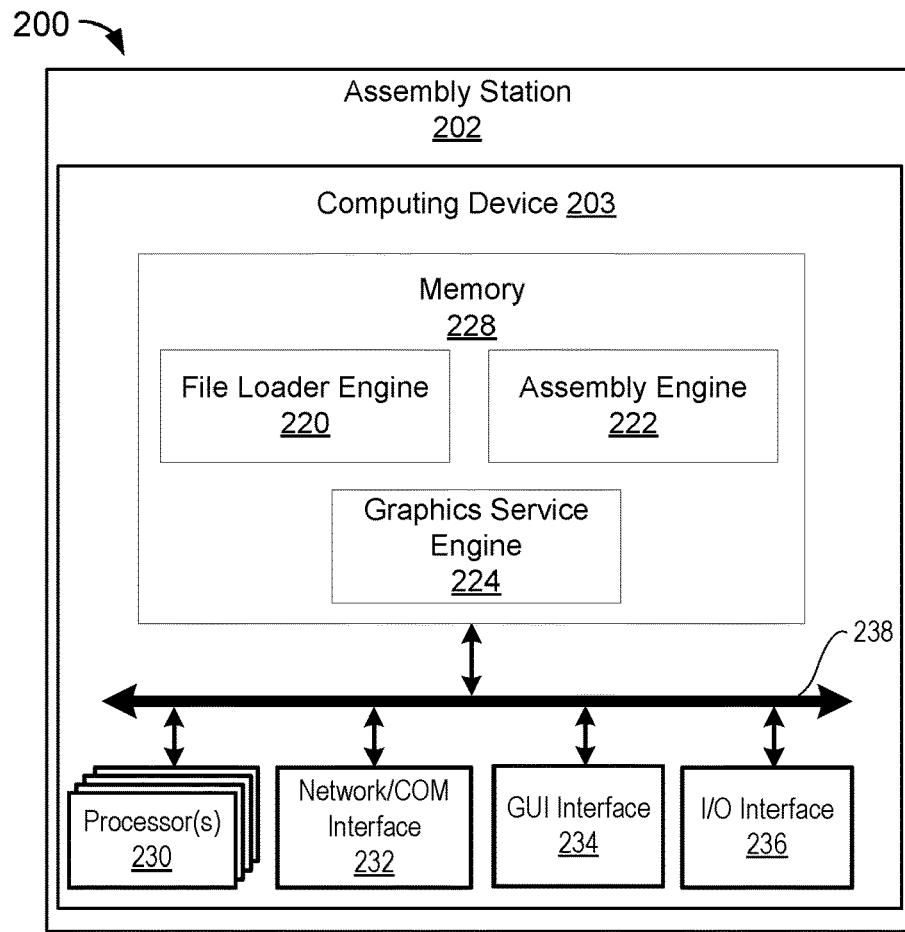
FIG. 2 is a block diagram of an assembly system for assembling structural components according to one embodiment.
Figure 2:
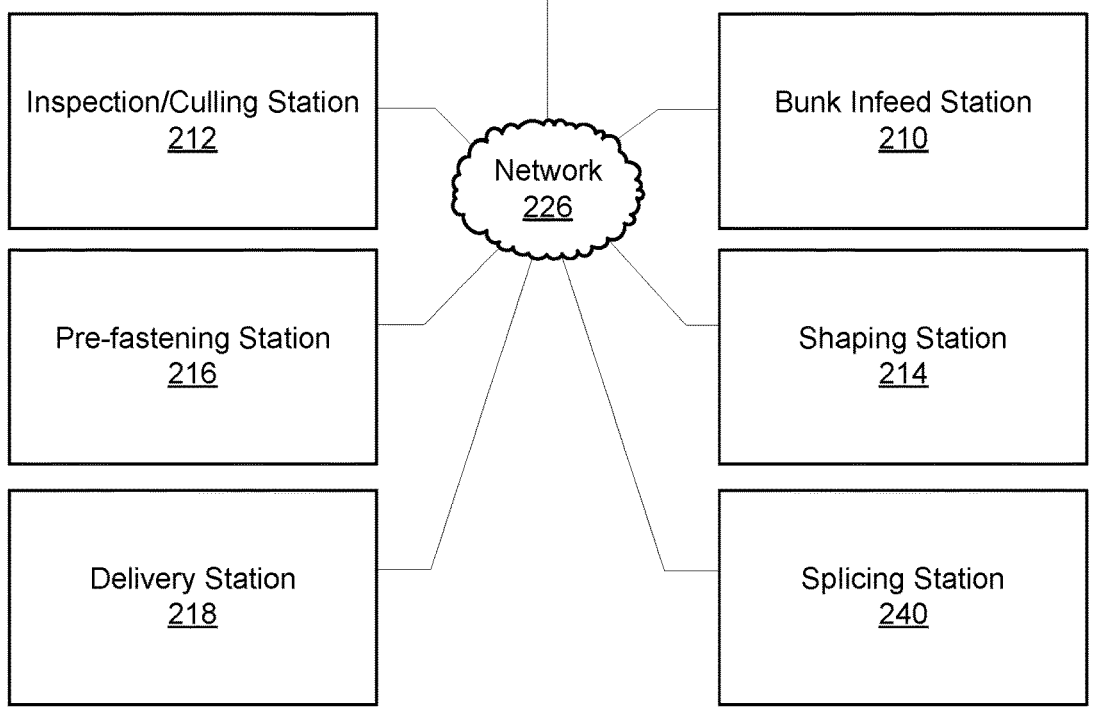

FIG. 2 is a block diagram of an assembly system 200 for assembling structural components according to one embodiment. The assembly system 200 may include an assembly station 202, a bunk infeed station 210, an inspection/culling station 212, a shaping station 214, a pre-fastening station 216, a delivery station 218, and a splicing station 240. The assembly system 200 may be configured to generate a sequence of operations and provide project data to its various stations to cause these stations to arrange, source, modify, and/or assemble one or more members into a structural component.

The assembly station 202 may be an embodiment of the assembly station that was described in FIG. 1.

The bunk infeed station 210 may be capable of sourcing material for a member to be placed by the assembly station 202. Materials found at the bunk infeed station 210 may be separated into or otherwise organized as bunks (or otherwise grouped) according to size and/or type. As will be described further below, examples of materials at the bunk infeed station may be wooden boards, metal beams, or any other material suitable for use as a member or as part of a member (either with or without additional shaping and/or splicing of the material).

The inspection/culling station 212 may receive material from the bunk infeed station 210 and inspect it for defects. A defect may be, e.g., an irregular size, shape, or other analyzed quality of an inspected material. A 3D check by the inspection/culling station 212 may check for defects in the size and/or shape of the material (or a portion of the material) such as improper length, improper width, and/or improper height. A 2D check by the inspection/culling station 202 may check for defects in the material (or portion of the material) such as cracks, knots, or other imperfections which may not affect the size or shape of the material but may still be of concern. The inspection/culling station 212 may be capable of rejecting a piece of material for use as a member/as part of a member if a defect is detected. The inspection/culling 212 station may use "deep learning" algorithms to improve its detection of defects over time.

The shaping station 214 may be capable of taking materials from the bunk infeed station 210 and/or the inspection/culling station 212 and shaping them into members (or shaped pieces of material that will eventually be spliced into a member) of a known size and/or shape. This may involve, for example, cuts to a piece of material (e.g., a wooden board or metal beam) that has been received at the shaping station 214, using a saw (or other cutting tool) of the shaping station 214. Stated otherwise, the shaping station 214 may comprise a saw or other cutting tool. The shaping station 214 may be able to make these cuts at any angle relative to the received piece of material. For example, the shaping station 214 may be able to cut perpendicular relative to a given face of the piece of material to control the length, width, and/or height of the member created. Further, the shaping station may be able to cut at a non-perpendicular angle relative to a given face of the piece of material in order to create a member with one or more bevels. These bevels may be useful to help one or more members so created to interlock with other members when being placed and/or fastened at the assembly station 202.

The splicing station 240 may be able to splice together multiple pieces of material received from any of the bunk infeed station 210, the inspection/culling station 212 and/or the shaping station 214 to create a single member. The splicing station 240 may be configured to use fasteners (and potentially the pre-fastening station 216) to attach two or more pieces of material together to perform the splicing.

The pre-fastening station 216 may receive members from, for example, the shaping station 214 and/or the splicing station 240 and attach one or more fasteners to the member preparatory to the member being placed by the assembly station 202 on a table of the assembly station 202. The pre-fastening station 216 may include a nail plate applicator in the case of wooden boards that will be attached together via the applied nail plates. The pre-fastening station 216 may use fasteners differently from the splicing station 240. For example, the pre-fastening station 216 may attach fasteners to members in a way that anticipates a future joint using the current fastener being fully formed at a later time (e.g., at an assembly table of the assembly station 202 (as further described below)). By contrast, the splicing station 240 may use fasteners to secure two sub-members together to splice the two sub-members into a single member.

The delivery station 218 may deliver pieces of material and/or members between the various other stations 210, 212, 214, 216, 240 of the assembly system 200 as herein described. This delivery may be accomplished via one or more conveyors of the delivery station 218. The delivery station 218 may include mechanisms (such as, e.g., servos) to precisely control the location of materials/members within the delivery station 218 and report these locations to the other stations of the assembly system 200 as needed.

One or more operations and/or functions of an assembly system (such as assembly system 200) as described herein may involve a computing device 203 physically associated with the assembly station 202, but other arrangements (such as a stand-alone computing device, or a computing device physically associated with another station of the assembly system) are contemplated. Communications throughout the system may be performed by a network 226 between each/any of the components. A computing device 203 implementing one or more functions of an assembly system may include memory 228, one or more processor(s) 230, a network/COM interface 232, a Graphical User Interface (GUI) interface 234 (for attaching, for example, a monitor or other device for presentation of a GUI to a user), and an I/O interface 236 (for attaching, for example one or more user input devices, such as a touchscreen, a keyboard and/or a mouse). Other hardware peripherals are contemplated. The network/COM interface 232 may be connected to the network 226 and may act to receive and/or distribute computer-readable instructions. A data bus 238 may interconnect each of the components 220-236 of the computing device 203.

One or more functions of an assembly system 200 may be divided among one or more engines or other units. For example, an assembly system (such as assembly system 200) may include a file loader engine 220, which may generally perform tasks related to receiving, decrypting, and/or parsing input files, an assembly engine 222, which may generally perform tasks related to generating an assembly sequence using data from the input files and user input and packaging data for transport, and/or a graphics service engine 224, which may generally perform tasks related to a GUI of the assembly system 200. These are given by way of example and not by way of limitation. Other functional divisions are contemplated. As illustrated, the memory 228 of the computing device 203 of the assembly station 202 may include these engines.

That the various components 220-236 of the computing device 203 have been illustrated as part of the assembly station 202 is given by way of example and not by way of limitation. It is anticipated that any or all of these or other components 220-236 could additionally or alternatively exist as part of a stand-alone computing device, or a computing device physically associated with another station 210-218 of the assembly system 200.

The assembly system 200 may receive one or more input files. Examples of input files may include a TRE file (by MiTek Industries Inc.) or an XML file. These input files may include information about one or more structural components to be assembled. For example, these input files may include information about the type of structural component to be assembled. This type information may include information about the size of the structural component to be assembled, the shape of the structural component to be assembled, and/or the one or more types of materials from which the structural component is to be assembled.

These input files may further include information about members to be used by the assembly system 200 to assemble a certain structural component. The one or more input files may include information about the material nature of the member to be used, which may be conveyed to the bunk infeed station 210 for sourcing of material for a member and/or to the inspection/culling station 212 for inspection of the material for the member. For example, this material nature information may describe whether the member is made of a particular grade or type of wood or metal. The input files may describe whether two or more pieces of material sourced by the bunk infeed station 210 (either before or after such pieces of material are inspected at the inspection/culling station 212 and/or shaped at the shaping station 214) should be spliced together at a splicing station 240 to form the member. Alternatively, the assembly system 200 may be able to use information about members from the input files to generate this splicing information.

The input files may include information about the dimensions and/or geometry of a member (or portion of a member to be spliced into a member), which may be conveyed to the shaping station 214. The input files may also include information about the vertices of a member (or portion of a member) to be used. These vertices may be described as x-y points on a cartesian plane. The cartesian plane used for this measurement may have an origin at the bottom left corner of a assembly table upon which the structural component that includes the member is to be assembled. The input files may also include information about the orientation of a member (or portion of a member) to be used. This orientation may be expressed as a number of degrees or radians measured from a known starting point. The starting point for measuring degrees or radians may be, for example, parallel with the positive x axis of the cartesian plane and may from there be measured in a counter-clockwise direction.

The one or more input files may further include information about fasteners to be used by an assembly system 200 to assemble a given structural component. The assembly system 200 may convey the fastener information to the pre-fastening station 216. The one or more input files may include information about the material nature of the fastener to be used. For example, the material nature information may describe whether the fastener is made of particular kind of wood or metal (such as, e.g., a gauge of steel fastener to be used). The input files may also include information about the size of a fastener to be used. In some embodiments, the input files may also include information about the particular locations on the fastener where the fastening between the fastener and a member will occur. For example, this information may include the locations and/or orientation of screw apertures in a metal nail plate relative to a point on the metal nail plate.

The one or more input files may also include cut information for a member to be used in a structural component, which may be conveyed to the shaping station 214. This cut information may include a location of a cut on a particular member. It may further include the angle of a cut on a particular member. This angle may be relative to any axis of the board relative to its entry into the shaping station.

The one or more input files may include member placement information for one or more members. This member placement information may include a placement location for a member. This location may be given relative to a point on the assembly table such as a bottom left corner of the table. The location may be intended to line up with a point on the member to be placed, such as a corner of the member and/or a bounding box center of the member (e.g., a point that comprises the center of a tight bounding box drawn using right angles around the member). The member placement information may further include an angle at which to place the member on the assembly table. The member placement information for a member may be stored in a matrix associated with the member.

The one or more input files may include fastener placement information for one or more fasteners. The assembly system 200 may convey the fastener information to the pre-fastening station 216. This fastener placement information may include a placement location for a fastener. This location may be given relative to a point on the assembly table such as a bottom left corner of the table. The pre-fastening station 216 may use this location information to determine where that fastener should be fastened on a member passing through the pre-fastening station 216 relative to a point on an individual member (e.g., the bottom left of the member as it passes through the pre-fastening station 216). The location may be intended to line up with a point on the fastener to be placed, such as a corner of the fastener and/or a bounding box center of the fastener. The fastener placement information may further include an angle at which to place the fastener on the assembly table. The fastener placement information for a fastener may be stored in a matrix associated with the fastener. The fastener placement information may include whether the fastener will be located on the "bottom" or the "top" of the members to which they will be attached and/or of structural components of which they will be a part (as those terms are explained above).

Data in the one or more input files may also include one or more identifiers for the members (or portions of members) and/or fasteners described in the one or more input files. These identifiers may be unique to a single member, portion of a member, and/or fastener of all the members, portions of members, and/or fasteners described in the one or more input files. A given member, portion of a member, and/or fastener may be represented by one or more of these identifiers across one or more of the input files. One or more of these identifiers may denote that a member was spliced together by the splicing station 240 from multiple pieces of material (as described above) that are represented as portions of members in the one or more input files. Alternatively, an identifier that denotes that a member was spliced together in this way may be generated by, for example, the computing device 203 of the assembly system 200 by using information from the input files about the members associated (or that has become associated) with those materials.

The assembly system 200 can consolidate the information from the one or more input files into one or more lists. A list may include information about the dimension, vertices, geometry, position, placement location, placement angle, or other information about one or more members to be used in the structural component. A list may instead (or additionally) include information about the dimension, vertices, geometry, position, placement location, placement angle, or other information about one or more fasteners to be used in the structural component.

A list may instead (or additionally) associate members and fasteners together. A fastener may be associated with a member if the dimensions/geometry of the fastener (represented by edges between vertices of the fastener relative to the placement position of the fastener) intersect the placement area of the member (represented by edges between vertices of the member relative to the placement position of the member). This process may associate a single fastener with one, two, or more than two member(s).

List data that associates members and fasteners in this fashion may identify a member by one or more identifiers of the member from the one or more input files. This list may further list any fastener(s) associated with that member by one or more identifiers of the fastener from the one or more input files. The assembly system 200 may further calculate, based on the information from the one or more data files, a position and/or an angle of a fastener relative to a point on the member (or relative to the member) with which it is associated. For example, the position of a fastener may be given in relation to a point on the associated member. Alternatively, the position of a fastener may be given in relation to a point that is related to the shape of the associated member. The angle of the member may be given in relation to the orientation of a member as retrieved by the robotic arm of the assembly station 202. It may be arranged to have the members be retrieved with a uniform orientation in order to simplify this process, but other techniques for determining member orientation at the time of retrieval by the robotic arm are contemplated.

The assembly system 200 then uses the data from the one or more lists to build a data model for a complete structural component. This data model may include a listing of the members of the complete structural component and, for each member listed, its associated fasteners.

Figure 3:
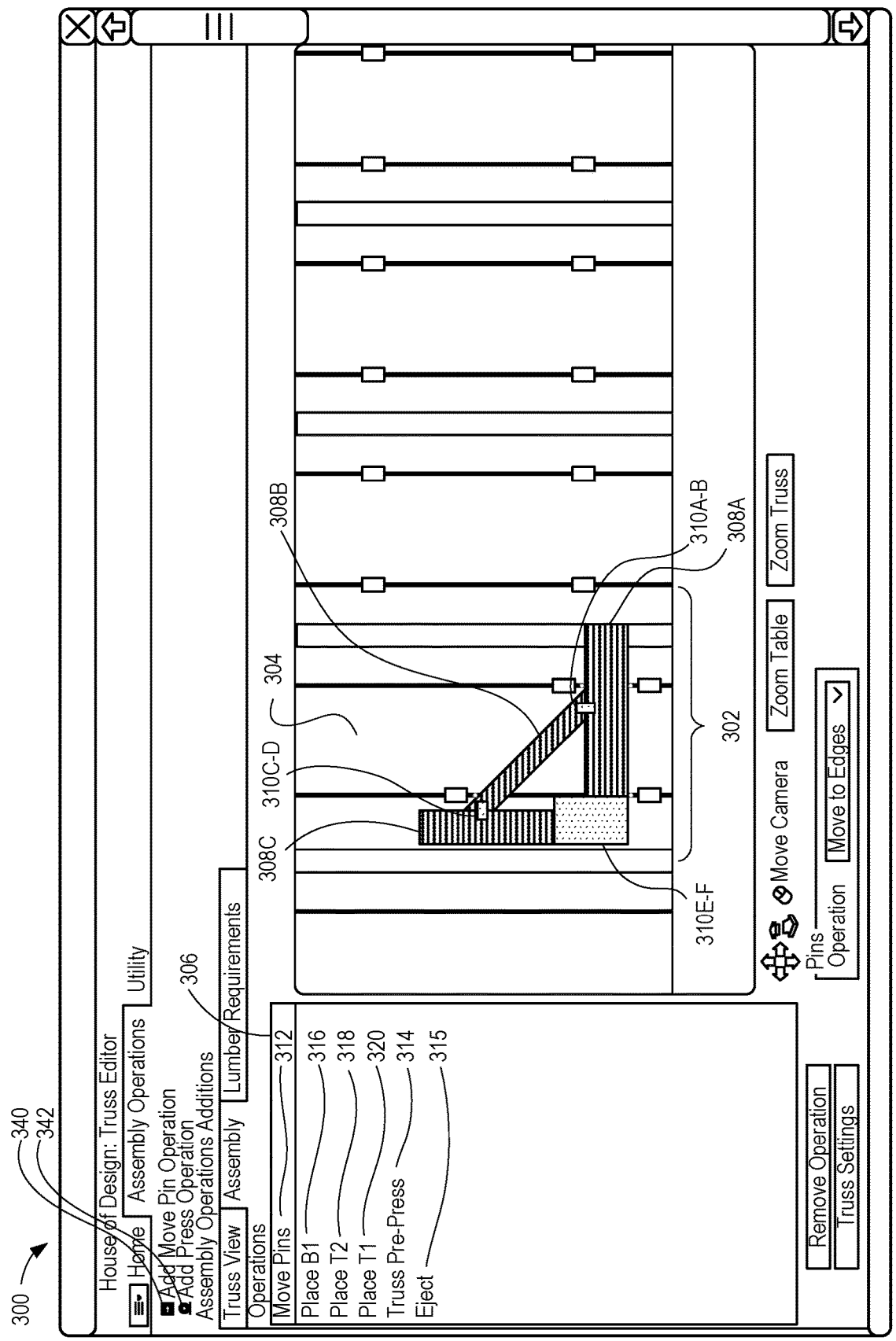
FIG. 3 is an illustration of a graphical user interface (GUI) of an assembly interface showing a component outline of a structural component to be assembled, an assembly table, and sequence, according to an embodiment.

FIG. 3 is an illustration of an assembly graphical user interface (GUI) 300 showing a component outline 302 of a structural component to be assembled, a assembly table 304, and a sequence window 306, according to an embodiment. This assembly GUI 300 may be displayed to a user of an assembly system on a display and may be configured to accept input from the user.

The component outline 302 may be based on a previously-created data model of a structural component (see above). The component outline 302 may indicate the member locations 308A-308C of the structural component. The component outline 302 may also indicate the fastener locations 310A-310F of the structural component.

The assembly GUI 300 further includes a sequence window 306 illustrating an ordered sequence of actions or operations to be performed by the assembly system. An ordered sequence of actions or operations being or to be performed by an assembly system is sometimes referred to herein as an 'assembly sequence'). This sequence may comprise an assembly order and operations for assembling the structural component. Some operations (e.g., the "Move Pins" operation 312) may be preparatory operations for preparing the assembly table 304 for the receipt of placed members. Other operations (e.g., the "Truss Pre-Press" operation 314 or the "Eject" operation 315) may be finishing operations, such as for finalizing any potential fastenings that exist between members and fasteners that have been placed into their appropriate assembly positions and/or for removing a completed structural component from the assembly table 304. Finally, some operations (such as the placement operations 316-320) may be operations that cause a board to be placed on the assembly table or other assembly surface (e.g., through the operation of a robotic arm). These placement operations 316-320 may each be associated with one of the member locations 308A-308C. Some or all types of the operations discussed herein (e.g., preparatory operations, finishing operations, and/or placement operations, etc.) may be referred to herein individually or collectively as 'assembly operations.'

Assembly operations may further include, for example, a "nudge" operation. A nudge operation may cause a robotic arm of the assembly table to nudge a placed member against another item, such as one or more pins and/or an already placed member. The robotic arm may perform this action by lowering a portion of the robotic arm below the top surface of the already placed member and against a side surface of the member opposite the desired nudge direction, and then exerting a force against that side surface in the nudge direction. The portion of the robotic arm positioned against the side surface may be, for example, a specialized paddle on the robotic arm that is rotated or otherwise moved into the proper position by the robotic arm to perform the nudge operation. A nudge operation may be useful to add to a sequence in order to help ensure that a member sits flush against another item, and may be manually added by an operator of the assembly system.

Assembly operations may further include, for example, a "Move In" and/or a "Move Out" operation. A "Move Out" operation may be useful for directing one or more pins of an assembly table to make small adjustments in their locations in order to, for example, account for the needs of another upcoming operation (such as, e.g., a placement operation where space is tight). A "Move In" operation may be useful for directing one or more pins of an assembly table to make small adjustments in their locations in order to, for example, more tightly hold a placed member in the proper location on the assembly table.

As will be further discussed below, it is contemplated that a user may use an assembly GUI 300 to re-order the assembly operations listed in the sequence window 306. This may be done by, e.g., using a user input device (such as a mouse and/or keyboard) to receive user input and re-order the assembly operations accordingly. It is further contemplated that a user may use an assembly GUI 300 to add assembly operations to the assembly operations listed in the sequence window 306. This may be done by, for example, using the add move pin operation button 340 and/or the add press operation button 342. The addition of other types of assembly operations (e.g., placement operations) is also contemplated.

At any point that an order of placement operations is established (and disregarding any intervening operations of non-placement type), the assembly system may update a copy of the list data that associates members and fasteners (described above) to associate only certain of the fasteners associated with the member of a given placement in the original list data. This determination of which fasteners to leave associated with which members in the copy of the list data may depend on the order of placement of the members reflected by the order of placement operations. For example, once an order of placement operations is established, a first member's fastener associations may be updated to include fasteners that will be located on the bottom of the member. This may be based on the determination that as a subsequent member is placed near the first (and potentially other) members such that all the members of the joint are present, this subsequent member will arrive with a fastener in the desired top position in order to complete the joint between the two (or more) members.

The assembly system may provide that the first placement of a member that is part of a joint includes a bottom fastener for that joint on that first member. The assembly system may further provide that the last placement of a member that is part of a joint includes a top fastener for that joint on that last member. In this manner, the first, intermediate, and last boards that are a part of the joint can all be placed without having to lift them to place a fastener at the bottom position; nor will it be necessary to remove a fastener that was prematurely placed on the top of a member to make room for another member.

The assembly system may also be capable of checking constraints related to a sequence of operations. These constraints may include, for example, whether there is room on the table to perform all the placement operations of the sequence, or whether there are or will be the types and sizes of members and/or fasteners to perform the sequence.

Figure 4:
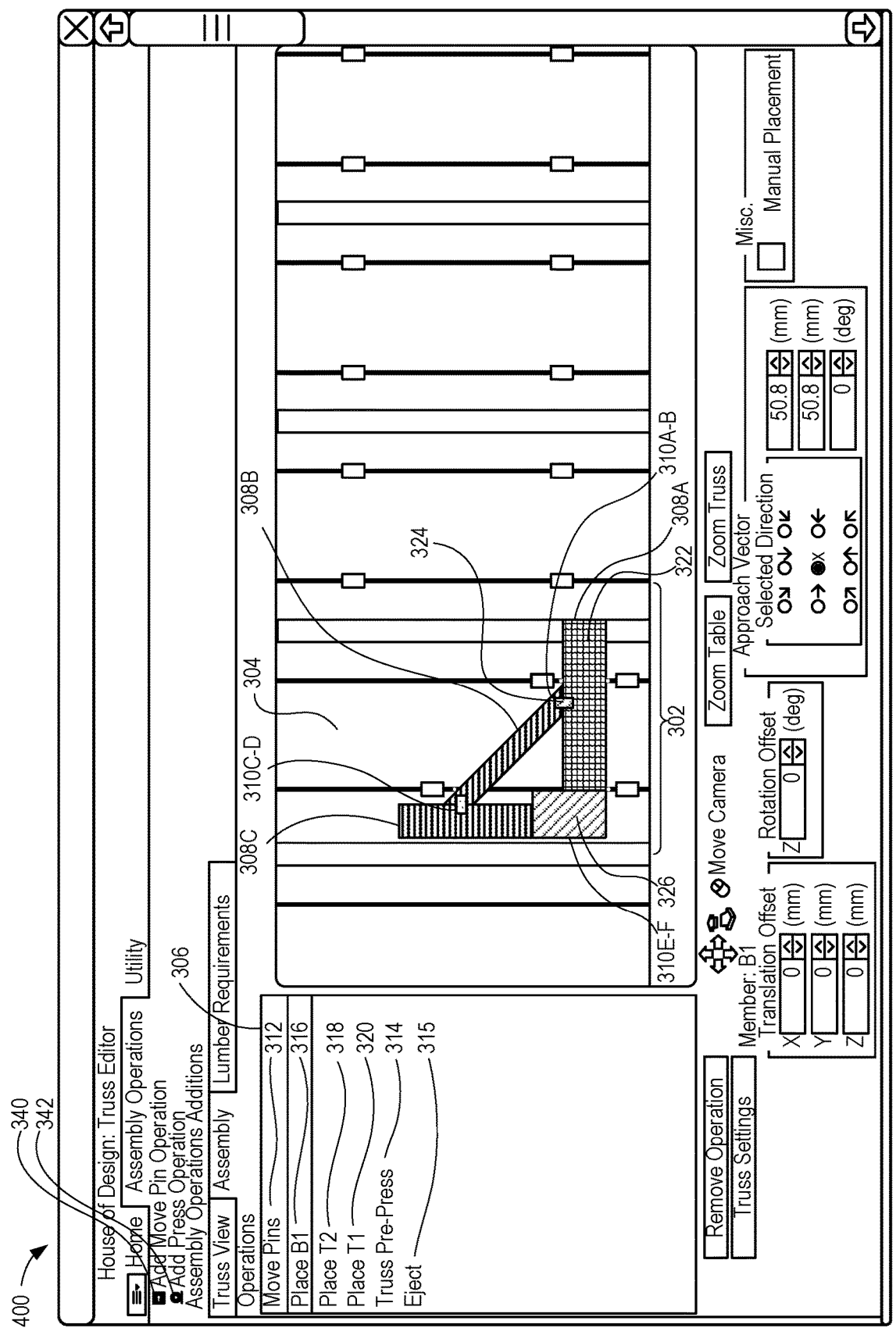
FIG. 4 is an illustration of a GUI 400 of an assembly interface modeling a placement of a member and an associated fastener, according to a sequence, according to an embodiment.

FIG. 4 is an illustration of the assembly GUI 400 modeling a placement of a member 322 and associated fasteners 324, 326, according to a first placement operation 316 of a sequence, according to an embodiment. By clicking through the placement operations 316-320, a user of the assembly GUI 400 may be able to view the placement order of members and their associated fasteners through the sequence. As shown by FIG. 4, when a user selects the first placement operation 316 of the sequence, the assembly GUI 400 changes to fill in the member location 308A with its associated member 322. In this case, the assembly system has determined (see above) that both joints associated with the member 322 are newly begun by the placement of the member 322 and therefore has also filled the fastener locations 310A and 310E with the bottom fasteners 324 and 326.

Figure 5:
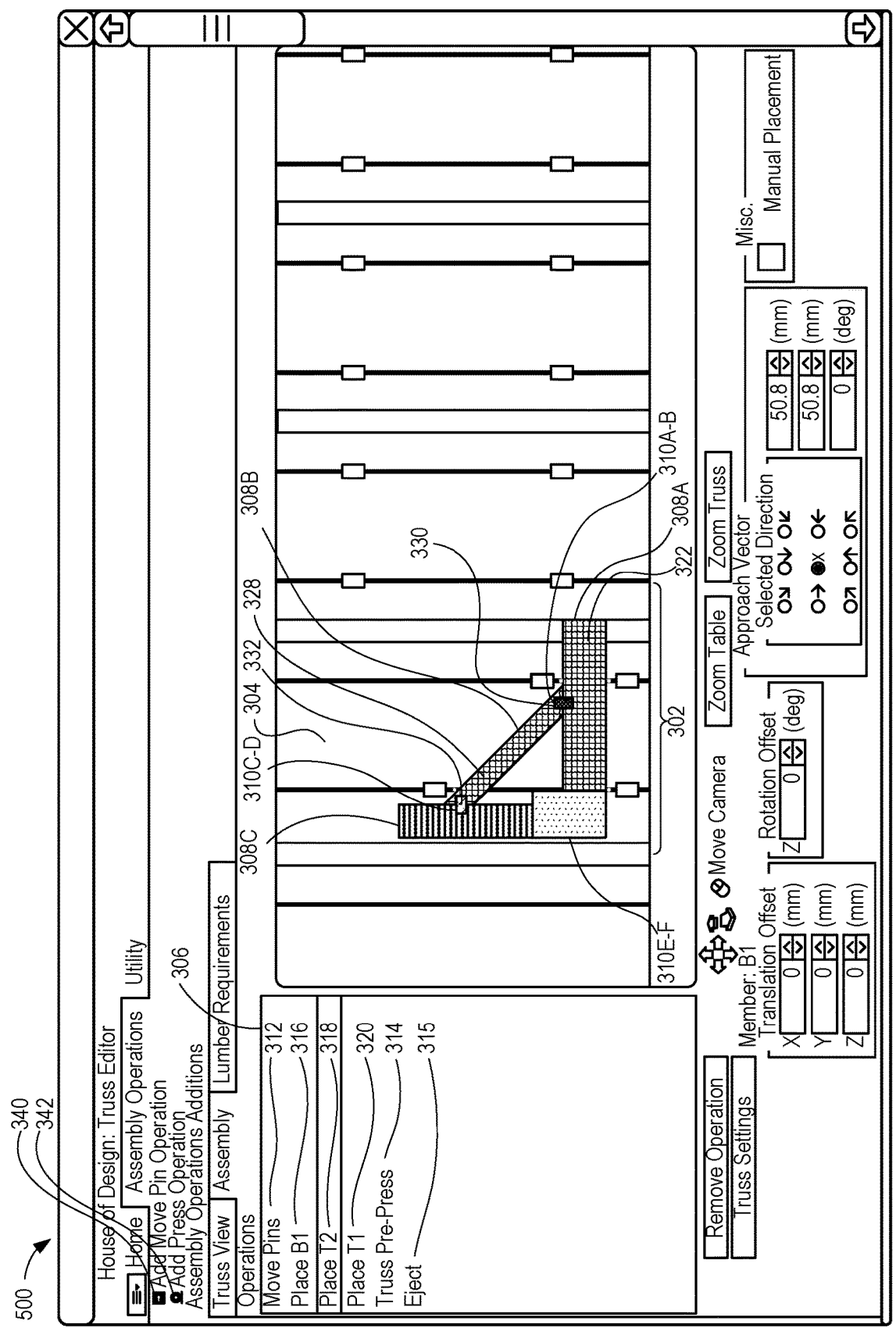
FIG. 5 is an illustration of the GUI 400 of an assembly interface modeling a placement of a member and associated fasteners, according to a sequence, according to an embodiment.

FIG. 5 is an illustration of the assembly GUI 500 of an assembly interface modeling a placement of a member 328 and associated fasteners 330, 332, according to a second placement operation 318 of a sequence, according to an embodiment. As shown by FIG. 5, when a user selects the second placement operation 318 of the sequence, the assembly GUI 400 changes to fill in the member location 308B with its associated member 328 and fastener locations 310B and 310C. In this case, the assembly system has determined that the one of the joints (between the member 322 and the member 328) is now complete and therefore has filled the fastener location 310B with the top fastener 330. Further, the assembly system has pre-determined that another joint associated with the member 328 is newly begun by the placement of the member 328 and therefore has also filled the fastener location 310C with the bottom fastener 332.

Figure 6:
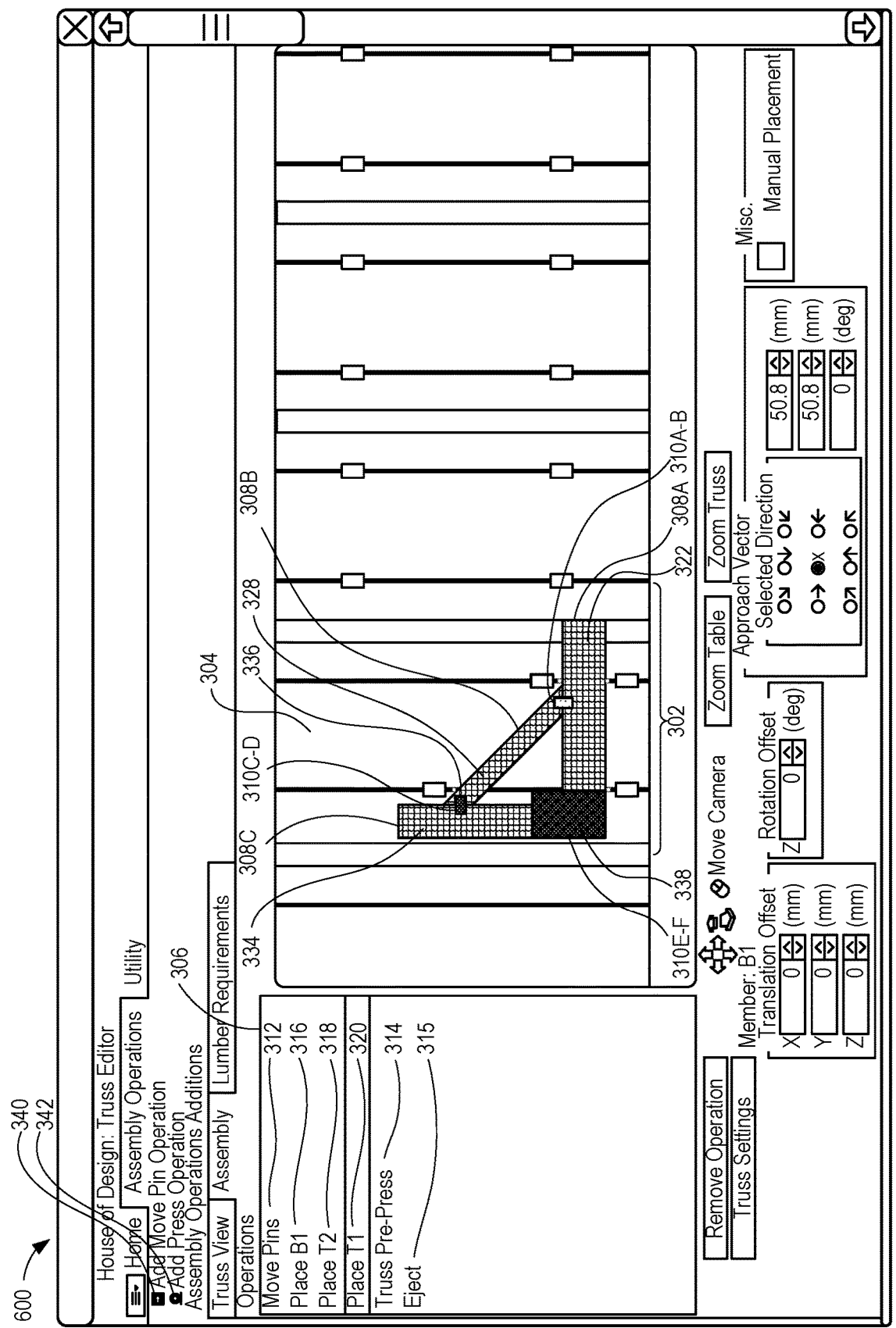
FIG. 6 is an illustration of the GUI 400 of an assembly interface modeling a placement of a member and associated fasteners, according to a sequence, according to an embodiment.

FIG. 6 is an illustration of the assembly GUI 600 modeling a placement of a member 334 and associated fasteners 336, 338, according to a third placement operation 320 of a sequence, according to an embodiment. As shown by FIG. 6, when a user selects the third placement operation 320 of the sequence, the assembly GUI 400 changes to fill in the member location 308C with its associated member 334 and fastener locations 310D and 310F. In this case, the assembly system has determined that both joints associated with the member 334 are ended by the placement of the member 328 and therefore has also filled the fastener locations 310D and 310F with the top fasteners 336, 338.

Figure 7:
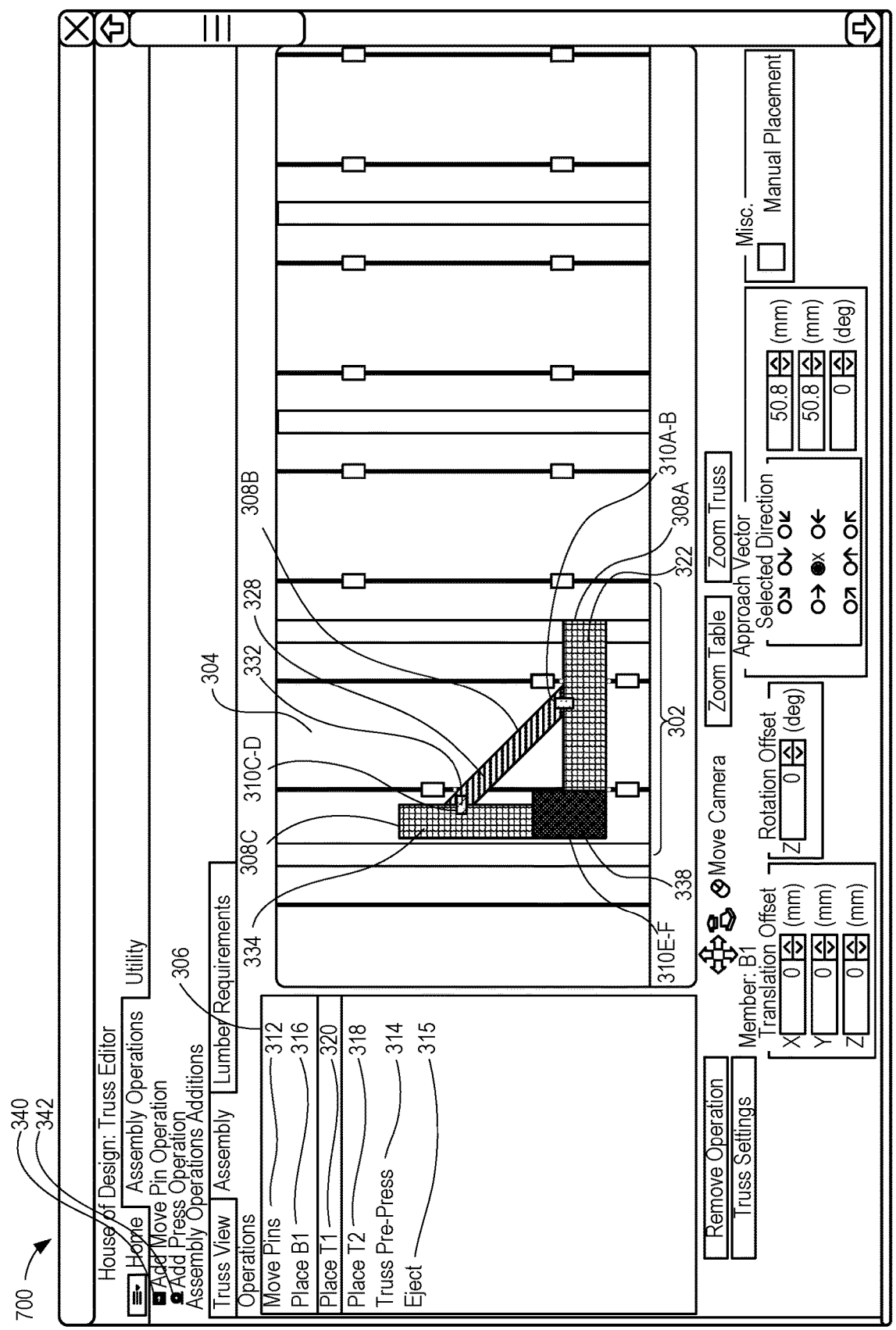
FIG. 7 is an illustration of the GUI 400 of an assembly interface modeling a placement of a member and associated fasteners, according to an alternate sequence, according to an embodiment.

FIG. 7 is an illustration of the assembly GUI 700 modeling a placement of a member 334 and associated fasteners 332, 338, according to a second placement operation 320 of an sequence, according to an embodiment. As shown, the placement operation 320 has been moved (e.g., by a user of the assembly GUI 700) to a position above the placement operation 318 and is now the second placement operation of the sequence. The assembly system may, in response, re-assess which fasteners are associated with which members in the copy of the list data (see above). Accordingly, when the user selects the second placement operation 320 of the sequence, the assembly GUI 700 changes to fill in the member location 308C with its associated member 334 and fastener locations 310C and 310F. In this case, the assembly system has pre-determined (in light of the new ordering of the placement operations 316-320) that the one of the joints (between the member 322 and the member 334) is now complete and therefore has filled the fastener location 310F with the top fastener 338. Further, the assembly system has pre-determined that another joint associated with the member 334 is newly begun by the placement of the member 334 and therefore has also filled the fastener location 310C with the bottom fastener 332.

Figure 8:
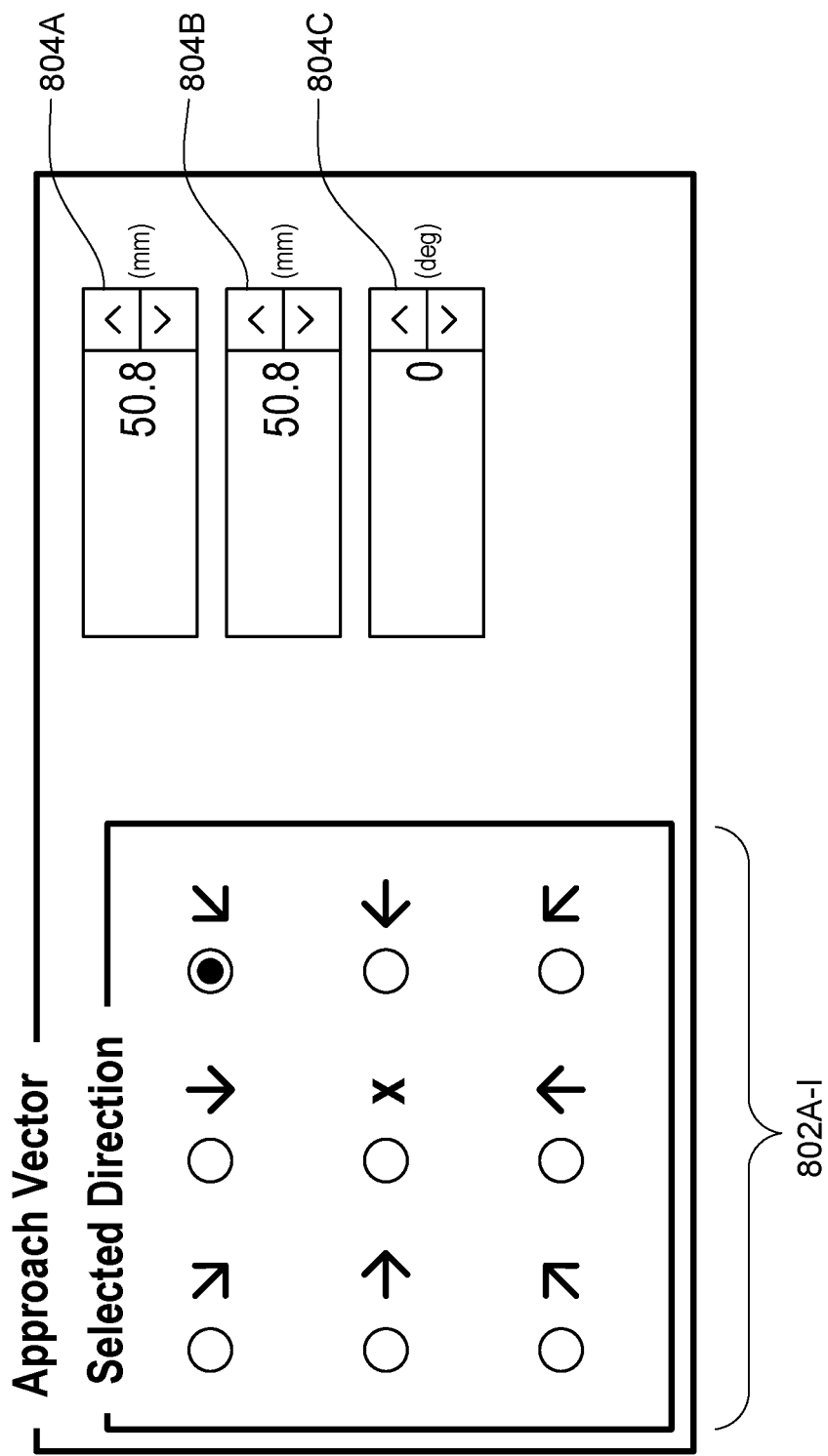
FIG. 8 is an illustration of part of a GUI of an assembly interface used for inputting an approach vector, according to one embodiment.

FIG. 8 is an illustration of part of an assembly interface GUI 800 used for inputting an approach vector, according to one embodiment. An approach vector may be associated with a placement operation of an assembly sequence. The approach vector may enable successful placement of a member corresponding to such a placement operation at or near other members that have already been placed. In many cases, the members that will have already been placed will not match exactly the ideal data model being used by the assembly system. Data associated with the approach vector may be used to break a placement operation into one or more sub-operations, which may more effectively maneuver a member during placement in order to account for potential mismatches between the ideal of an already placed member (e.g., that was placed during a previous placement operation). At least one of these sub-operations may be designed to position the bottom surface of a member being placed during the operation (as viewed looking down at the table) below (in the z-direction, i.e., toward the top surface of the table) a top surface of one or more members that have already been placed on the table either before or as the member being placed approaches the placement position. In this way, a collision between the bottom surface of the member being placed and a top surface of the member(s) already placed (as may result from an irregular size of any of these members) may be avoided. Similarly, a sub operation may be designed to position the bottom surface of a member being placed during the operation (as viewed looking down at the table) below (in the z-direction) a top surface of one or more pins acting as jig stops for the member, as that behavior is described above. In this way, a collision between the bottom surface of the member being placed and a top surface of the pin(s) acting as jig stops may be avoided.

When a user has selected a placement operation as in FIGS. 4-7 above, the user may further be given the option to assign the placement operation an approach vector (with direction and offset). The direction of the approach vector may be selected using one or more of the radio buttons 802A-802I, with 802E representing a straight down direction and 802A-802D, 802F-802I representing respective angled directions. It is contemplated that in some embodiments, other selection directions could be made available, using radio buttons or some other form of input (e.g., numerical input).

The offset of the approach vector may then be selected by filling one or more of the offset value boxes 804A-804B with a numeric value. This may cause the robotic arm of the assembly station of the assembly system to begin lowering the member associated with the placement operation from a raised position that is offset from the straight down positioning by the given amounts. The combined effect of the use of an approach direction and offset value(s) is that the "angle" at which the member approaches the assembly table can be modified to reduce likelihood or risk of an irregular or otherwise unexpected engagement between a member that will be placed and a member that will have already been placed on the assembly table.

An offset rotation angle of the member may be entered into the offset value box 804C. This offset may cause the robotic arm to rotate a member being placed above a z-axis (when viewing the table of the assembly station from above) before the member is placed. This rotational offset may also help the assembly station more efficiently place the member and/or place the member without collisions with already placed members.

In some embodiments, the system may have already pre-assigned a default approach vector to the selected placement operation. This may be a default approach vector that is assigned to the placement operations as a matter of course, with the anticipation that a user can then change the pre-assigned approach vector using, for example, the part of the assembly interface GUI 800 as herein described. In other embodiments, the pre-assigned approach vector may have been determined in response to the system predicting the appropriate approach vector to use with the placement operation based on, for example, known information about previously placed members according to a current assembly order known in the system. The user may still proceed to change the pre-assigned approach vector of the placement operation using, for example, the part of the assembly interface GUI 800 as herein described. In other embodiments, no approach vector is associated with a placement operation unless and until a user uses, for example, the part of the assembly interface GUI 800 to associate an approach vector to the placement operation.

Figure 9C:
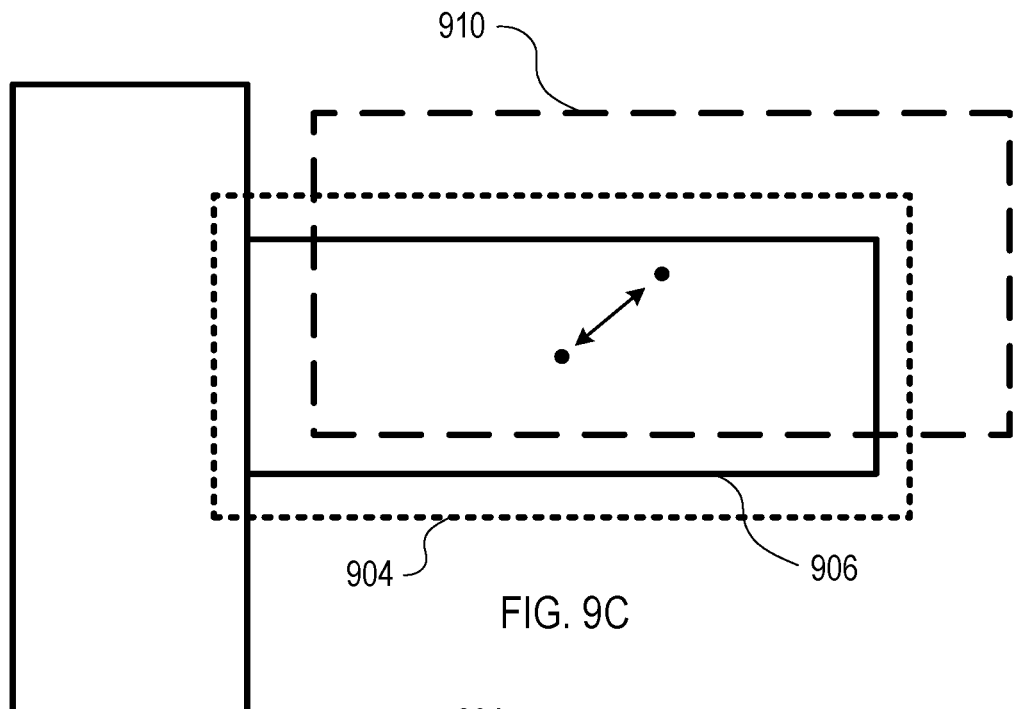

FIGS. 9A-9E illustrate comparatively the effects of using (or not) an approach vector during member placement, according to some embodiments. FIGS. 9A and 9B illustrate how the positioning occurs from both the top view of FIG. 9A (looking down at the assembly table (not illustrated) from above) and the side view of FIG. 9B (looking across the assembly table (not illustrated) in a direction substantially parallel to a top surface of the assembly table) when an approach vector is not used. In this case a member would begin in an approach position 904 and be placed straight downward to end in the placement position 906. This type of placement operation may be less complicated and/or quicker than a placement operation that has been broken into multiple sub-operations, and therefore may be preferred in cases where concern with placement issues due to non-ideal members is limited or non-existent. This type of placement operation may be associated with a selection of a straight down vector approach direction (e.g., the radio button 802E of FIG. 8).

Figure 9D:
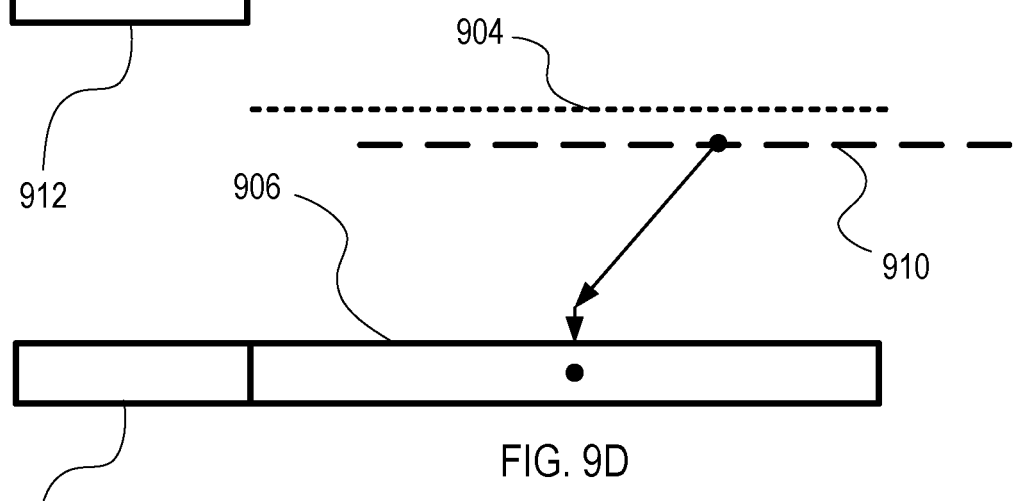
Figure 9E:
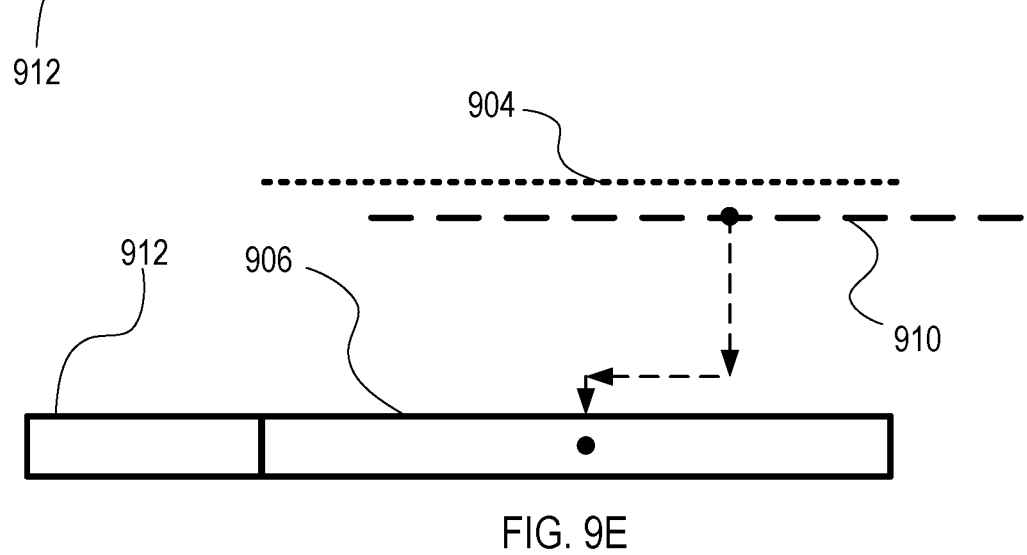

FIGS. 9C-9E instead illustrate how positioning may occur from both the top view of FIG. 9C (looking down at the assembly table, not illustrated) and the side views of FIGS. 9D and 9E (looking across the top surface of the assembly table) when an approach vector (with an offset and direction) is used. In these cases, a member would begin in an approach position 910 and end in the placement position 906. The approach position 910 may be a position that is offset from the desired placement position 906 in the direction of a specified angled direction (e.g., the direction selected by one of the radio buttons 810A-810D and 810E-810I of FIG. 8) and by an amount specified by one or more offset parameter (e.g., values entered into one or more of the offset value boxes 804A-C of FIG. 8). In FIGS. 9C-9E, the alternate approach position 904 of FIGS. 9A and 9B is illustrated for comparison purposes only.

A set of sub operations according to FIGS. 9C and 9D may include moving the member being placed in a relatively straight line from the approach position 910 to a position just above the placement position 906. This arrangement may ensure that at the time during the sub operation that the plane associated with the bottom of the member being placed breaks the plane associated with the top of the member(s) that have already been placed, such as the placed member 912, there is still a distance between the member being placed and the members that have already been placed. This may help limit or remove the chance of having a collision as described above. This sub-operation may end with the member being placed in a position that is essentially in between the already placed members and just above the placement position 906. A subsequent sub-operation may then manipulate the member being placed into the placement position 906.

An alternative set of sub operations according to FIGS. 9C and 9E may include moving the member being placed from the starting approach position 910 straight downward to point that is above the table but below the plane associated with the tops of the member(s) that have already been placed such as the placed member 912 (and by so doing avoid the chance of any collision between the bottom of the member being placed and the tops of the member(s) already placed such as the placed member 912 during a subsequent move in an x-y direction (when viewing the table from above). A subsequent sub-operation may then move the member being placed in an x-y direction to a point that is just above the placement position 906. A subsequent sub-operation may then manipulate the member being placed into the placement position 906. Again, the alternate approach position 904 of FIGS. 9A and 9B is shown for reference.

Once the user of the assembly system is satisfied with the generated sequence and any approach vectors, one or more project data files will be generated. These one or more project data files may contain (or be used to subsequently generate) project data to be sent to one or more stations, such as a shaping station and or a pre-fastening station. These one or more output files may also be sent to a controller of a robotic arm of an assembly station so that the robotic arm has the data it needs to place the members it retrieves according to the data model and sequence of operations heretofore generated. The contents of the project data file may include member geometry, fastener geometry, fastener to structural member association, assembly operations, and/or an assembly sequence.

Figure 10:
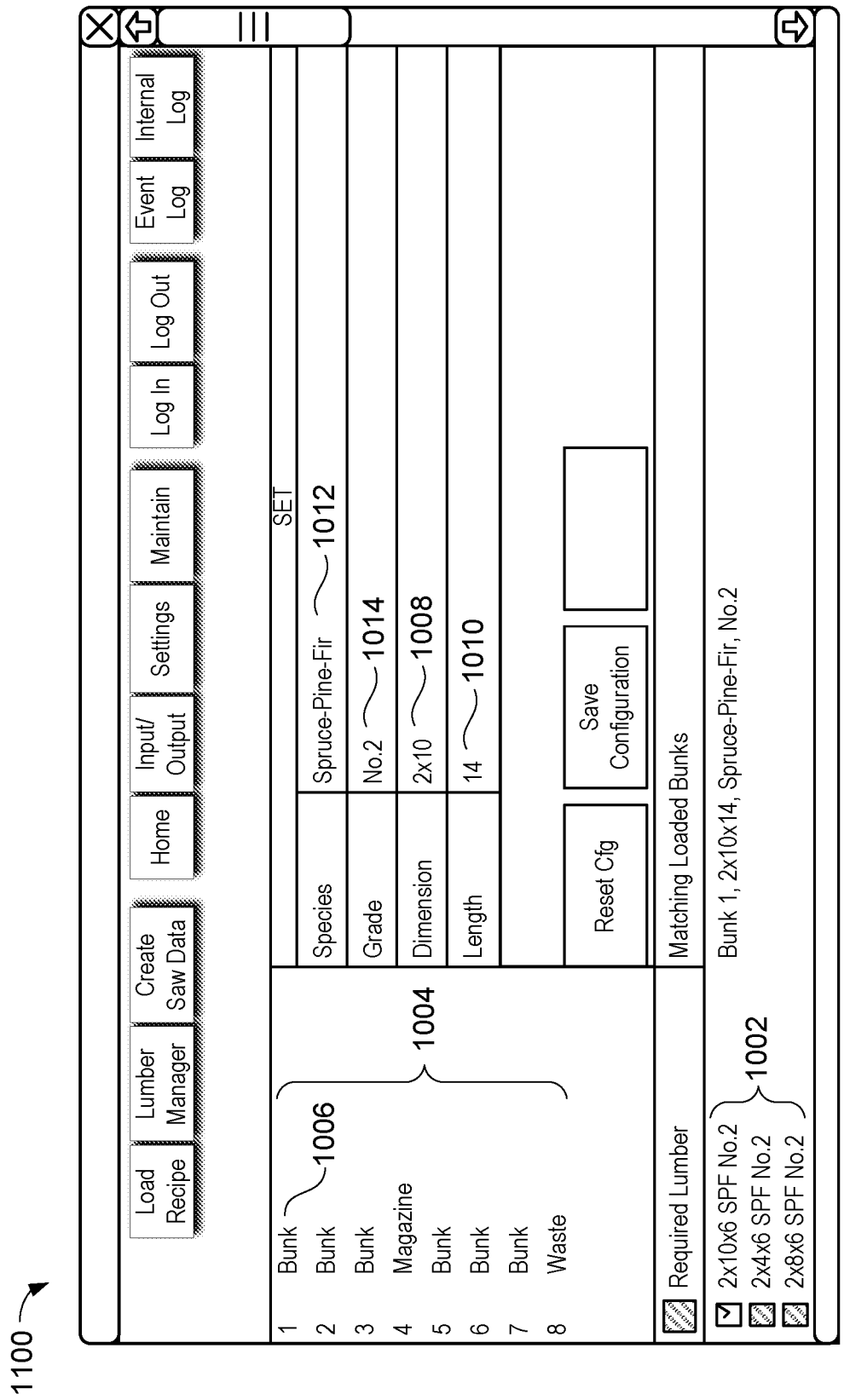
FIG. 10 is an illustration of a bunk assignment interface showing source bunk assignments for sourcing the various members of structural component, according to an embodiment.

FIG. 10 is an illustration of a bunk assignment interface 1100 showing source bunk assignments for sourcing the various members of structural component, according to an embodiment. While not required, an assembly system may include a bunk infeed station, a splicing station, and/or a shaping station. In this case, the assembly system may provide a list 1002 of the various source materials that will be used to create one or more of the structural components represented in the data files (e.g., the one or more input files, the various list data, and/or the project data). The assembly system may further provide a source list 1004 of all the bunks (or other sources, such as magazines) available on the associated member bunk infeed station. These sources may each supply a quantity of one specific (e.g., consistent type and size) of material that can be used (with or without subsequent shaping and/or splicing) as a member.

A user of the assembly system may select a one of the sources 1006 of the source list 1004 and review details regarding the size (e.g., dimension 1008 and/or length 1010) and type (e.g., species 1012 and/or grade 1014) of material that is provided by that source. The user may also correct or change this information if necessary (e.g., if the information regarding the material provided by one or more of the sources in the source list 1004 is outdated). The assembly system may automatically determine whether each of the various members from the list 1002 could be served by the materials in at least one of the of the bunks from the source list 1004, and may indicate whether there is a source with materials that are of the type and size (or at least could be shaped and/or spliced together to the appropriate size) of each member of the list 1002. This data may be organized into, e.g., a CSV file by the assembly system in preparation to send to the bunk infeed station for use in the collection of source materials for the assembly station and any intervening stations.

Once the lumber is assigned, instructions for a shaping station and/or a splicing station may be generated. The assembly system may consider what materials are available in the bunks and the assembly sequence of the members of the structural component in order to determine how to use the various materials in the bunks to source/shape/splice members. The assembly system may try to make this determination in a material-wise efficient manner. For example, members desired by the assembly system may be generally grouped together based on size. The assembly system then searches for the smallest piece of material available at the bunk infeed station that will hold the most members. If no match is found, the assembly system tries the next largest piece of material available at the bunk infeed station. If no appropriate material is found for the group of members, the assembly system may reduce the group size and repeats the process until all members have been assigned to be shaped from one or more pieces of material.

FIG. 11 is a GUI 1100 that may be displayed to a user to illustrate generated instructions for a shaping station. Information from the any of the input data from the one or more input files and/or any of the generated list data may then be used in conjunction with this process in order to create a set of project data to be sent to a shaping station. Information that may be used in this manner includes the member ID and coordinate data for the member (whether relative to a point on the member or relative to a point on the assembly table).

In some cases where both a shaping station and a pre-fastening station (see above) are both used, once the instructions for the shaping station are generated, corresponding project data for the pre-fastening station may be generated. The project data for the pre-fastening station may contain an ordered list of members (as they would come out of the shaping station and/or any splicing station) along with a description of the placement (location, angle/orientation, and/or top/bottom status), the type, and/or the size of the one or more fasteners to be applied to that member.

Finally, project data may be created for the assembly station. This project data may include instructions for the robotic arm of the assembly station as to the sizes, locations, and orientations, sequencing, approach vectors (including direction and/or offset), bounding box centers, or other attributes of the members to be placed as part of the assembly process of a desired structural component (as those attributes have been described above).

Additionally, information about where to locate the member, e.g., on the delivery station that is feeding members to the robotic arm of the assembly station, may be included in the project data. Members may be fed to the robotic arm of the assembly station via the delivery station from another station, such as a shaping station or a pre-fastening station. This location information may be associated with a point (e.g., a bounding box center) of the member to be retrieved by the robotic arm. The robotic arm may receive a signal of the current location of a member on, e.g., a conveyor of a delivery station from such delivery station.

Figure 12:
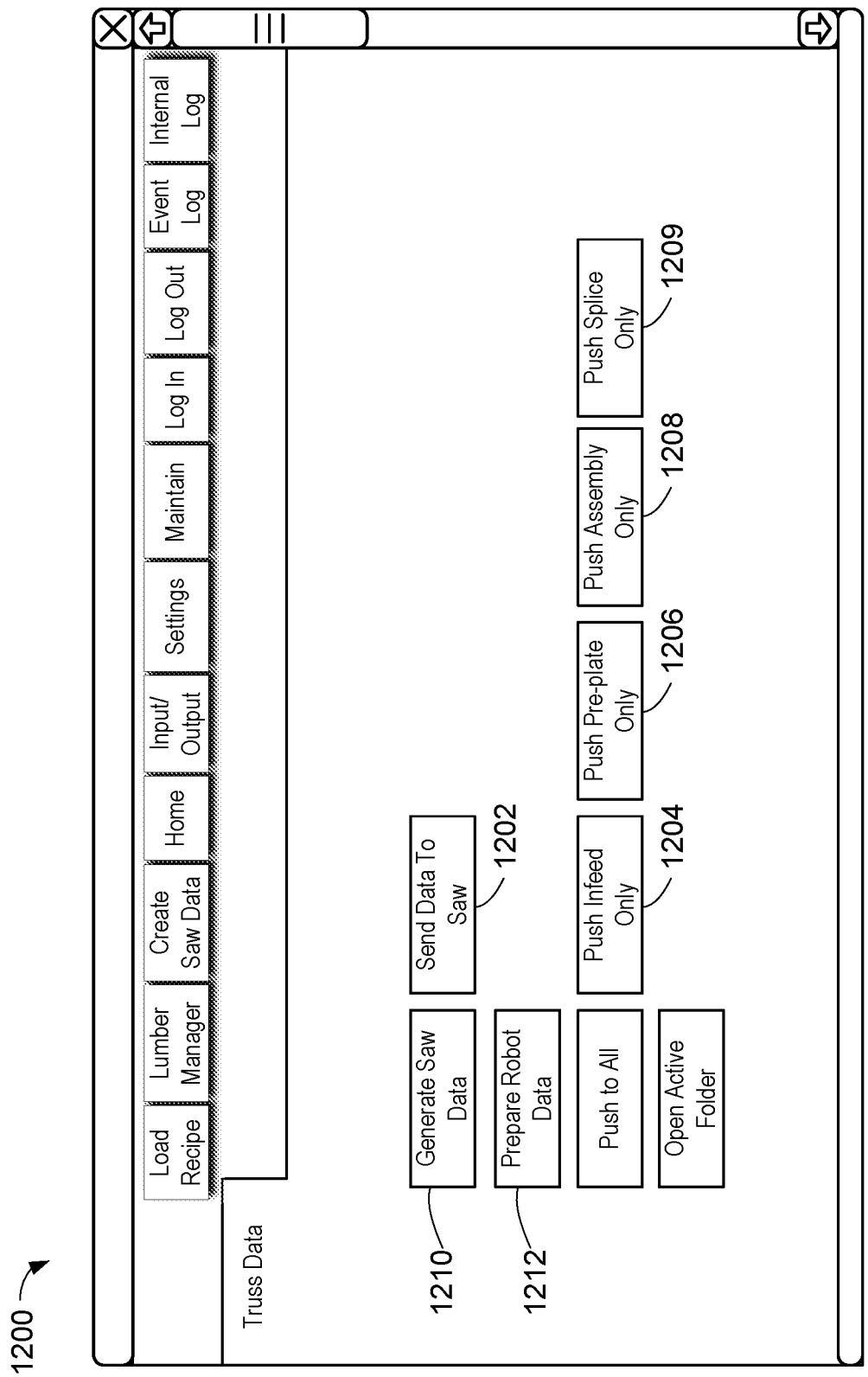
FIG. 12 is an illustration of a data send interface showing various options for sending project data to various stations of an assembly system, according to an embodiment.

FIG. 12 is an illustration of a data send interface 1200 showing various options for sending project data to various stations of an assembly system, according to an embodiment. Once the project data has been generated (see above), a user of the assembly system may interact with one or more of the buttons 1202, 1204, 1206, 1208, 1209 to send the project data to, respectively, a shaping station, a bunk infeed station, a pre-fastening station, an assembly station, and/or a splicing station. Buttons may also be provided to generate or re-generate the data that has been described herein (for example, the button 1210 to generate data for the shaping station and/or the button 1212 to generate data for the robotic arm). In other embodiments, the project data may be sent to one or more of these stations automatically at a point after which the project data has been generated (without the need to press one of the buttons 1202, 1204, 1206, 1208, 1209). When data arrives at the various desired locations, the assembly system is ready to operate automatically to create the desired structural component.

Figure 13A:
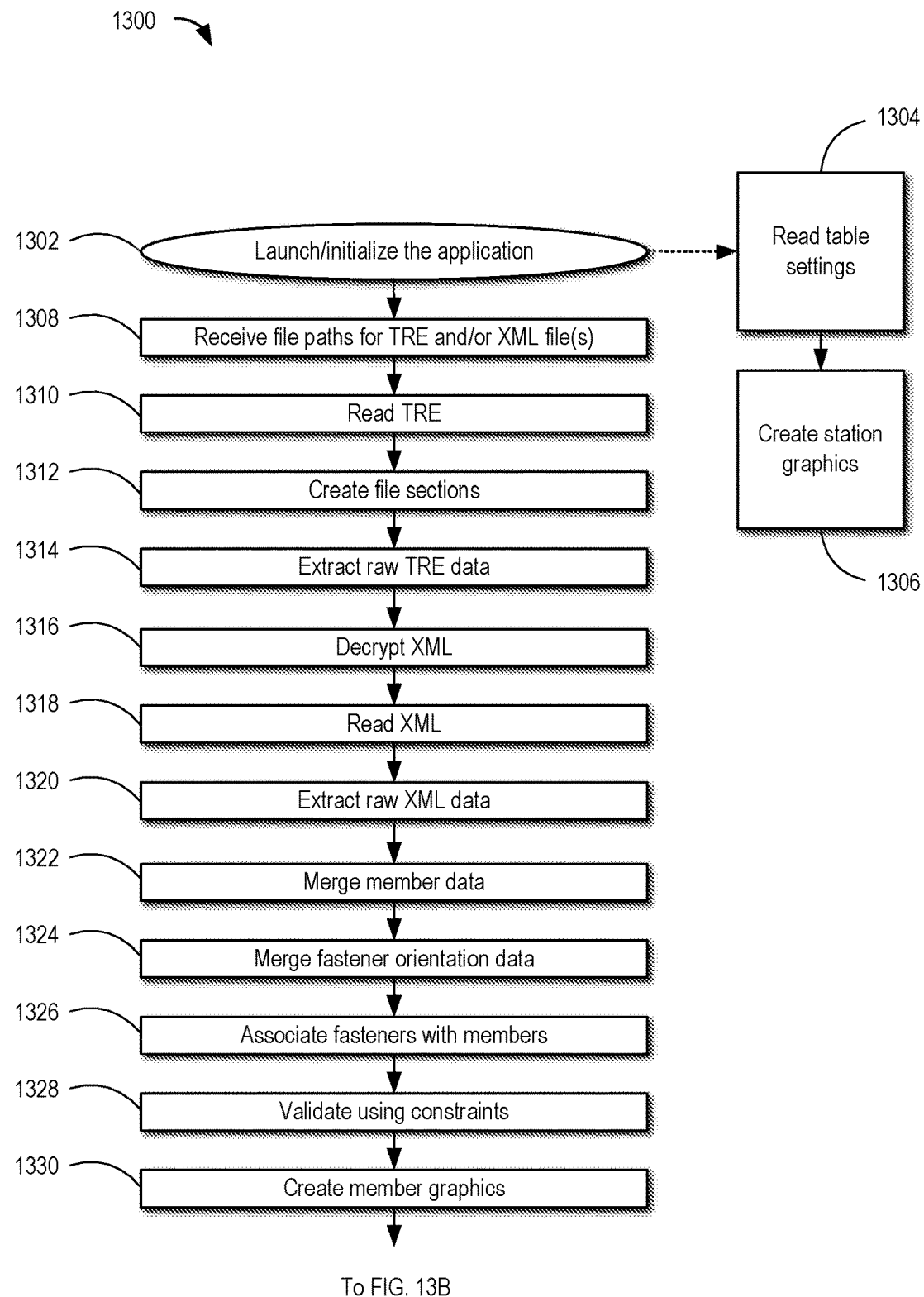
FIGS. 13A and 13B are a flowchart illustrating a method for generating project data for use with an assembly system, according to an embodiment.
Figure 13B:
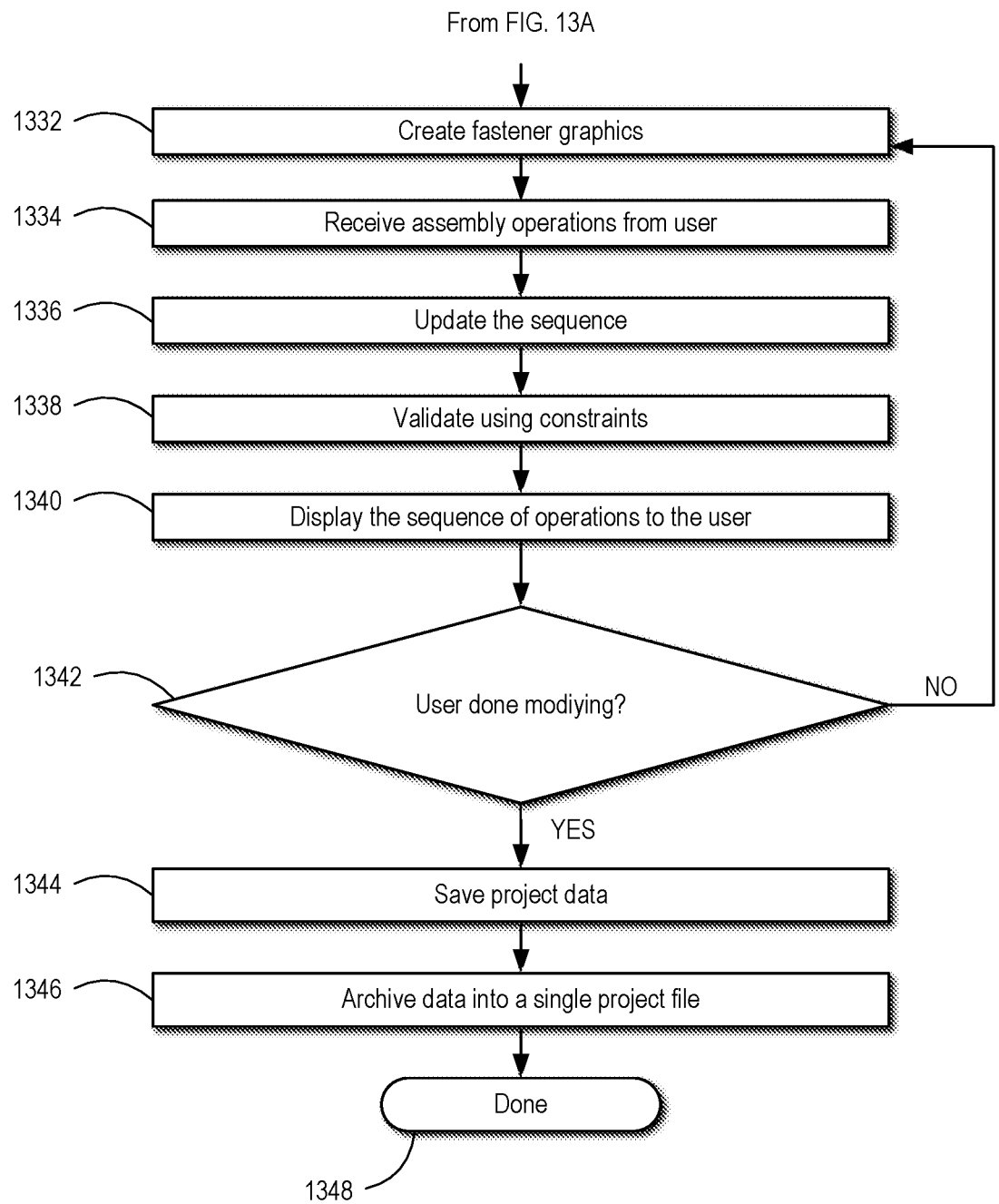

FIGS. 13A and 13B are a flowchart illustrating a method for generating project data for use with an assembly system, according to an embodiment. The method 1300 may include launching/initializing 1302 the application to generate the project data.

The method 1300 may then optionally proceed to reading 1304 table settings. These settings may include the table position, the pin lanes on the table, and/or the pop-up positions of the pins in the table.

The method 1300 may then proceed to create 1306 station graphics. These station graphics may include graphical representations of the table, pin lanes in the table, pop-up positions of the pins in the table, and/or a representation of a gantry press used by the system.

The method 1300 may include receiving 1308 file paths for TRE and/or XML file(s). These file(s) may be input files to the system as discussed above.

The method 1300 may include reading 1310 a TRE file.

The method 1300 may include creating 1312 file sections from the data in the TRE file. Each file section may correspond to, e.g., member, fasteners, or other categories of items disclosed in the TRE data.

The method 1300 may include extracting 1314 raw data from the TRE file. The extracted data from the TRE file may be sourced from the TRE file (and/or from the file sections corresponding to the TRE file). This data may include structural component type, member vertices, member raw dimensions, member label, fastener label, fastener dimensions, an x and/or y location of a joint associated with a fastener, a quantity of a particular fastener, a gauge of a particular fastener, etc.

The method 1300 may include decrypting 1316 an XML file.

The method 1300 may include reading 1318 the XML file.

The method 1300 may include extracting 1320 raw data from the XML file. This data may include member angle, member position on the table, member transforms to and/or from a shaping device coordinate system and an assembly table coordinate system, fastener angle, a list of cuts needed (corresponding to either one or more than one member), and other member data.

The method 1300 may include merging 1322 data related to the one or more members represented by the one or more input files. This merging may take place by referring to a member label in, e.g., an input file containing a cutlist sequence for a saw of a shaping station and associating it with a (potentially different) label for the same member in a second input file.

The method 1300 may include merging 1324 fastener orientation data. This merging may act to associate the fastener data from one or more of the input files to the fastener data of another input file. This may include associating a label for a fastener from one input file with a (different) label for the same fastener in a second input file. This merging process may also (or alternatively) include converting a value representing an angle at which a fastener should be attached to a member from on input file to a value for that angle that may be expected by the assembly system.

The method 1300 may include associating 1326 fasteners with members. This association may create a correspondence between one or more members of the merged member data and one or more members of the merged fastener data. These associations may be created based on a joint relationship between a member and one or more fasteners.

The method 1300 may include validating 1328 using constraints. Examples of types of constraints may be, e.g., ensuring that the structural component represented by the merged data is of a size that can be assembled by the system (e.g., that it will fit on the table) and/or of a type that can be assembled by the system (e.g., that it will be made of material with which the system is configured to operate). Further examples may be checking whether one or more members of the structural component is too small or too large to be shaped at a shaping station, and whether one or more fasteners being attached to members at a pre-fastening station will have sufficient surface area contact with the associated member to successfully be pre-fastened.

The method 1300 may include creating 1330 member graphics that may be displayed to a user of the system.

The method 1300 may include creating 1332 fastener graphics that may be displayed to a user of the system.

The method 1300 may include receiving 1334 assembly operations from a user. These operations may include member placement operations; beginning and/or end datums; intermediate presses, movements of the pins of the assembly table, or any other user-assignable assembly operation. These operations may also be received as user instructions to re-order operations of which the system is already aware.

The method 1300 includes updating 1336 the sequence of operations according to the received assembly operations. This may include adding an operation to the sequence, removing an operation from the sequence, and/or reordering existing operations of the sequence. These actions may affect the assembly order of members of a structural component being assembled by the sequence of operations (and correspondingly may also have an effect on the operations associated with, e.g., fasteners corresponding to those members).

The method 1300 may include validating 1338 using constraints. This validation may ensure that, e.g., the order of placement of members represented in the sequence (and the placement their corresponding fasteners) is not physically impossible (e.g., due to any obstruction by a previously-placed member and/or fastener, either from the fact that an outright collision between, e.g., a top fastener and a later-placed member is clear from the data model and associated sequence, and/or from a determination that while the data model and the associated sequence do not inherently contain this type of collision, a collision is still somewhat likely due to proximity and non-ideal variations in either of the top fastener and/or the later-placed member). Some or all of the previous constraint checks already run during the method 1300 may be re-run at this stage. Any re-run of a previous constraint check may be at least partially in response to (and/or take into account) any new or updated sequence of operations.

The method 1300 may include displaying 1340 the sequence of operations to the user. This displaying may illustrate the building of the structural component corresponding to the sequence of operations on a step-by-step basis, as described above in relation to FIGS. 3-7. This display may show member placement, fastener placement, press position and/or use, other additional objects added by the user, etc.

The method 1300 may include checking 1342 whether the user is done modifying the sequence of operations. If the user is not finished modifying the sequence of operations, the method 1300 returns to creating 1332 fastener graphics that may be displayed to a user of the system.

If the user is finished modifying the sequence of operations, the method 1300 proceeds to saving 1344 project data. The saved project data may contain member and/or fastener geometry, association between fasteners and members, and one or more sequences of operations for each station of the system corresponding to the data collected above. A sequences saved in the project data may be an "assembly sequence" as that term is used herein. This project data may further contain a copy of any input (e.g., XML and/or TRE) files. The project data may be found in one or more files, one or more of which may have a .HDT (e.g., .hdt) extension.

The method 1300 may include archiving 1346 this data into a single file.

The method 1300 may then finish 1348.

Figure 14A:
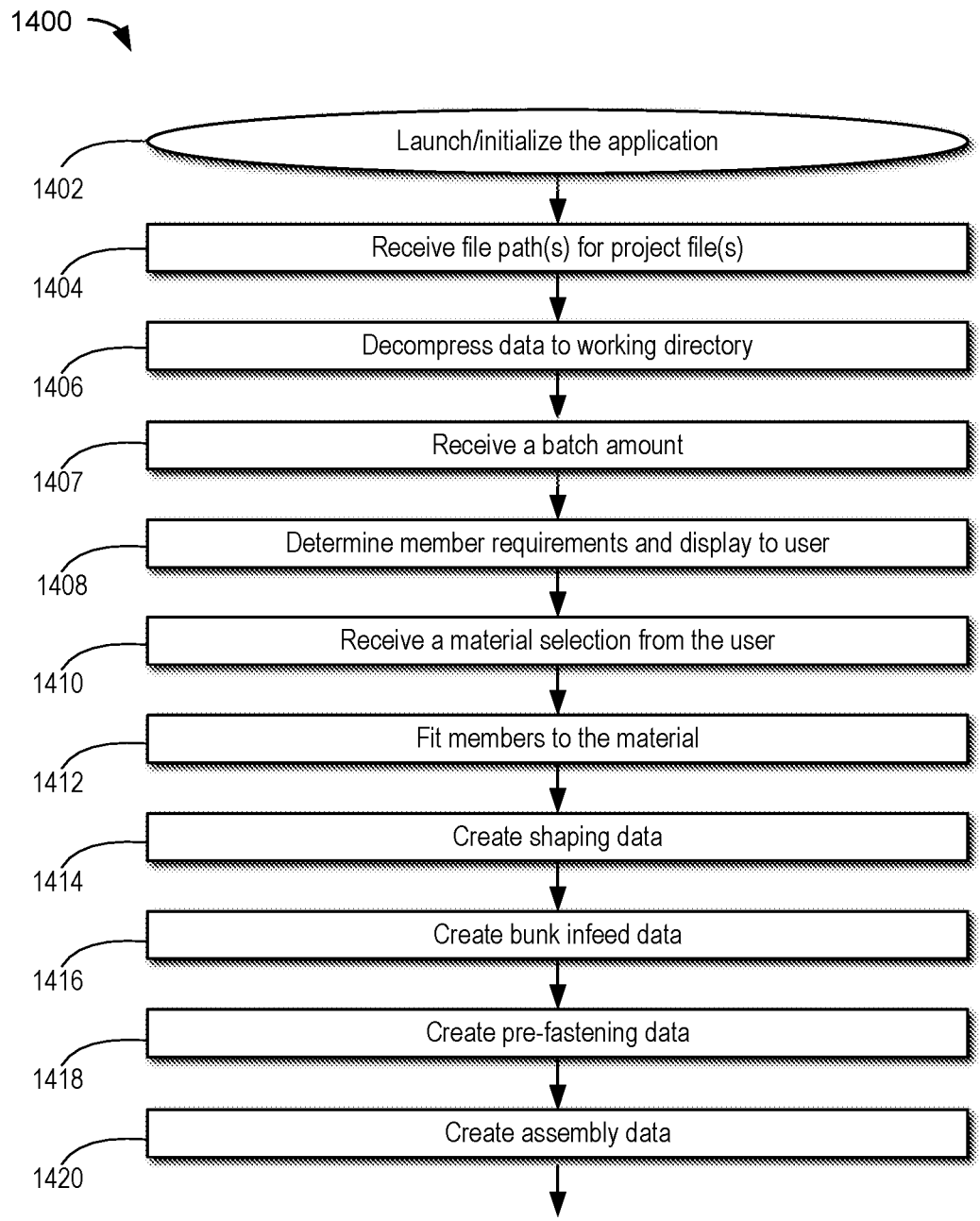
FIGS. 14A and 14B are a flowchart illustrating a method for receiving and using project data at an assembly system, according to one embodiment.
Figure 14B:
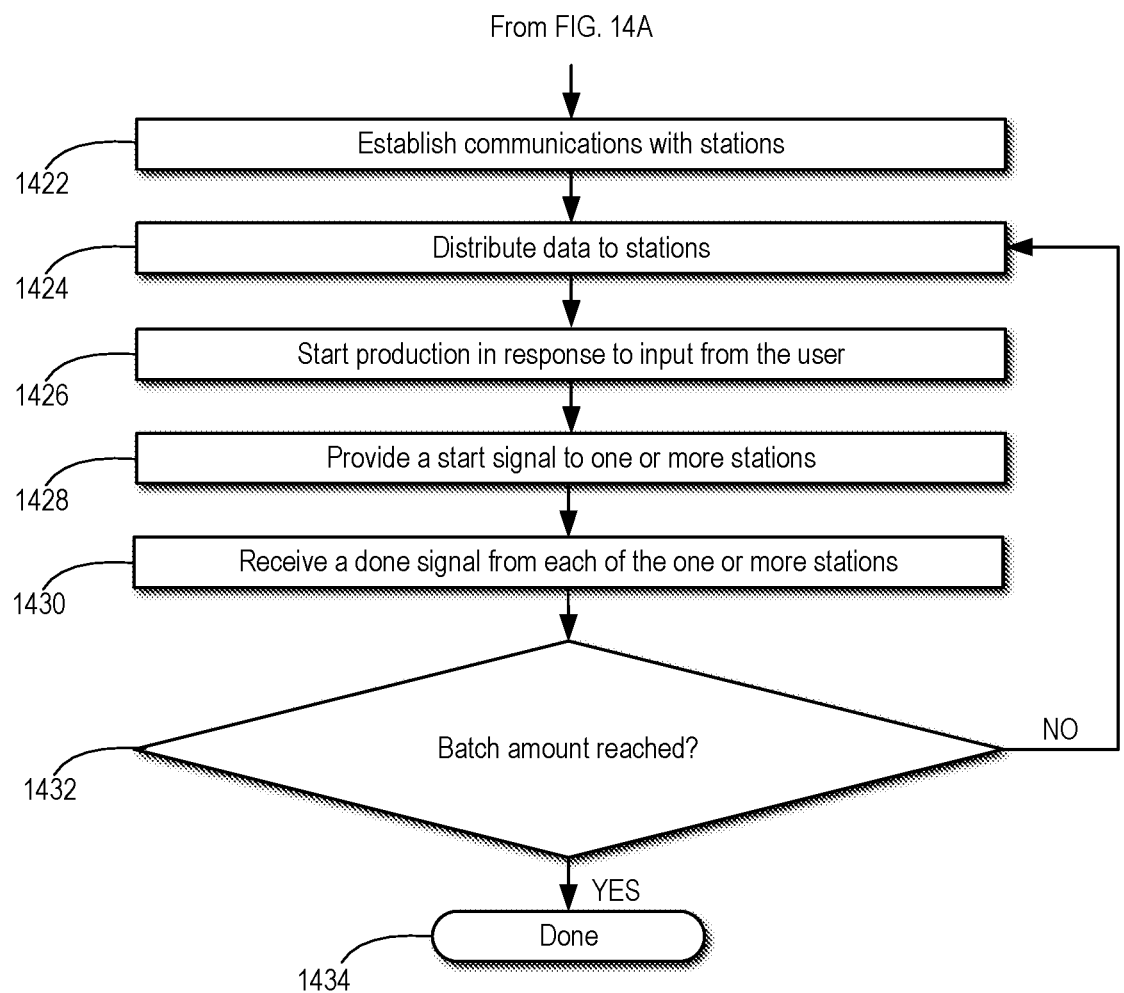

FIGS. 14A and 14B are a flowchart illustrating a method for receiving and using project data at an assembly system, according to one embodiment. The method 1400 may include launching/initializing 1402 the application to use the project data.

The method 1400 may include receiving 1404 file paths for project files of the project data. These project files may be according to the description of project file(s) as described above.

The method 1400 may include decompressing 1406 data to a working directory. The data decompressed may be the project file(s).

The method 1400 may include receiving 1407 a batch amount. This batch amount may be received via input from the user or from an input file. This batch amount may represent the number of times the assembly system is to create a structural component represented in the project data.

The method 1400 may include determining 1408 member requirements and displaying them to the user. These requirements may be, e.g., the material and/or size of the member.

The method 1400 may include receiving 1410 a material selection from a user. The material selection may indicate that the user wants one or more members to be shaped from (and/or spliced together using) the selected material.

The method 1400 may include fitting 1412 members to the material. The members may be fitted to a material in anticipation of a shaping device proceeding to shape the material into the one or more fitted members.

The method 1400 may include generating 1414 shaping data. This data may contain instructions for the shaping device that enable the shaping device to create the members from the material to be shaped. Shaping data may be in CSV form.

The method 1400 may further include creating 1416 bunk infeed data. This data may relate to the selection of materials from a bunk infeed station as a source for members. This data may be based on the fit of members to materials present on a bunk infeed station. Assignments of materials available at the bunk infeed station may have been previously indicated by the user. Bunk infeed data may be created to correspond with an assembly sequence present in the project file(s). Bunk infeed data may be in CSV form.

The method 1400 may include creating 1418 pre-fastening data. The pre-fastening data may include information about members labels and/or member dimensions, and may further include information about fastener positions and/or fastener dimensions. This data may be arranged into frames, where each frame comprises pre-fastening data about a member and its associated fastener(s). Pre-fastening data may be created to correspond with an assembly sequence present in the project file(s). Pre-fastening data may be in CSV form.

The method 1400 may include creating 1420 assembly data. The assembly data may include one or more operations to be executed by an assembly table. For example, the assembly data may indicate that a member is picked up, that a member is placed, that a structural component (or part thereof) is to be pressed, that a completed (or incomplete) structural component is to be ejected, etc. This information may include parameters for carrying out one or more operations to be executed by an assembly table. For example, parameters for a placement operation may include x, y, and/or z coordinates corresponding to a final placement of a member on the assembly table, or x, y, and/or z coordinates corresponding to a starting location of a placement motion. As another example, parameters for a pick operation may include x, y, and/or z coordinates corresponding to a location from which to pick up a member (either relative to the table or relative to a point on that member). Other types of operations and/or parameters are contemplated within this data. This data may be arranged into frames, where each frame includes an operation and one or more parameters associated with that operation. Assembly data may be created to correspond with an assembly sequence present in the project file(s). Assembly data may be in CSV form.

The method 1400 may include establishing 1422 communications with various stations of the assembly system. These may include communications with an assembly station, a bunk infeed station, a shaping station, an inspection/culling station, a pre-fastening station, a splicing station, and/or a delivery station.

The method 1400 may include distributing 1424 data to stations. For example, bunk infeed data may be distributed to a bunk infeed station, pre-fastening data may be sent to a pre-fastening station, splicing data may be sent to a splicing station, and assembly data may be sent to an assembly station.

The method 1400 may include starting 1426 production in response to input from the user. The user may hit a physical button or may interact with a GUI to provide this input.

The method 1400 may include providing 1428 a start signal to one or more stations. This signal may cause the receiving station to begin following instructions found in data previously received from the assembly system. This may include sending a start signal to an assembly station, a bunk infeed station, a shaping station, an inspection/culling station, a pre-fastening station, a splicing station, and/or a delivery station.

The method 1400 may include receiving 1430 a done signal from each of the one or more stations. This done signal may indicate to the assembly system that each of the stations associated with the assembly system is now ready to work again.

The method 1400 may include checking 1432 whether the batch amount has been reached. If the batch amount has not been reached, the method 1400 may return to providing 1428 a start signal to one or more stations (e.g., in order to create another structural component to get closer to the batch amount).

If the batch amount has been reached, the method 1400 may then finish 1434.

The foregoing specification has been described with reference to various embodiments, including the best mode. However, those skilled in the art appreciate that various modifications and changes can be made without departing from the scope of the present disclosure and the underlying principles of the invention. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Embodiments herein may include various engines, which may be embodied in machine-executable instructions to be executed by a general-purpose or special-purpose computer (or other electronic device). Alternatively, the engine functionality may be performed by hardware components that include specific logic for performing the function(s) of the engines, or by a combination of hardware, software, and/or firmware.

Principles of the present disclosure may be reflected in a computer program product on a tangible computer-readable storage medium having stored instructions thereon that may be used to program a computer (or other electronic device) to perform processes described herein. Any suitable computer-readable storage medium may be utilized, including magnetic storage devices (hard disks, floppy disks, and the like), optical storage devices (CD-ROMs, DVDs, Blu-Ray discs, and the like), flash memory, and/or other types of medium/machine readable medium suitable for storing electronic instructions. These instructions may be loaded onto a general purpose computer, special purpose computer, or other programmable data processing apparatus to produce a machine, such that the instructions that execute on the computer or other programmable data processing apparatus create means for implementing the functions specified. These instructions may also be stored in a computer-readable memory that can direct a computer or other programmable data processing apparatus to function in a particular manner, such that the instructions stored in the computer-readable memory produce an article of manufacture including instruction means which implement the function specified. The instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified.

Principles of the present disclosure may be reflected in a computer program implemented as one or more software modules or components. As used herein, a software module or component may include any type of computer instruction or computer-executable code located within a memory device and/or computer-readable storage medium. A software module may, for instance, comprise one or more physical or logical blocks of computer instructions, which may be organized as a routine, a program, an object, a component, a data structure, etc., that perform one or more tasks or implement particular data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Suitable software to assist in implementing the invention is readily provided by those of skill in the pertinent art(s) using the teachings presented here and programming languages and tools, such as Java, JavaScript, Pascal, C++, C, database languages, APIs, SDKs, assembly, firmware, microcode, and/or other languages and tools.

Embodiments as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, MS-DOS, Windows, Linux, Unix, AIX, CLIX, QNX, OS/2, and MacOS. Alternatively, it is expected that future embodiments will be adapted to execute on other future operating systems.

It will be obvious to those having skill in the art that many changes may be made to the details of the above-described embodiments without departing from the underlying principles of the invention. The scope of the present invention should, therefore, be determined only by the following claims.

The invention claimed is:

1. A structural component assembly system comprising:
an assembly station comprising an assembly surface;
an assembly tool configured to access the assembly surface;
one or more memories having computer-readable instructions stored thereon; and
one or more processors that execute the computer-readable instructions to:
generate or modify an assembly sequence to assemble a structural component, the assembly sequence comprising one or more placement operations for each of a plurality of structural members of the structural component, each of the one or more placement operations comprising an approach vector comprising a direction and an offset;
generate project data comprising the assembly sequence; and
communicate the project data to the assembly station to utilize the assembly tool to place the plurality of the structural members on the assembly surface of the assembly station according to the direction and the offset of the approach vector for that structural member.

2. The structural component assembly system of claim 1, further comprising a shaping station to shape one or more of the plurality of structural members, wherein the one or more processors further execute computer-readable instructions to:
determine information comprising at least one of a dimension, geometry, or cut of each one of the one or more of the plurality of structural members; and
convey the information to the shaping station to allow the shaping station to shape the one or more of the plurality of structural members according to the information.

3. The structural component assembly system of claim 1, further comprising a pre-fastening station to fasten one or more fasteners to one or more of the plurality of structural members, wherein the one or more processors further execute computer-readable instructions to:
determine information about the one or more fasteners to be applied to each of the one or more of the plurality of structural members; and
convey the information to the pre-fastening station to allow the pre-fastening station to apply the one or more fasteners to the one or more of the plurality of structural members according to the information.

4. The structural component assembly system of claim 1, further comprising a bunk infeed station comprising source materials for assembling the structural component, wherein the one or more processors further execute computer-readable instructions to:
determine information about the source materials needed for assembling the structural component; and
convey the information to the bunk infeed station to allow retrieval of the source materials identified in the information.

5. The structural component assembly system of claim 1, wherein the project data further comprises one or more of member geometry, fastener geometry, or fastener to structural member association.

6. The structural component assembly system of claim 1, wherein the one or more processors further execute computer-readable instructions to:
determine a default approach vector assigned to each of the one or more placement operations;
receive a change in the default approach vector via a user interface; and
update the default approach vector based on the change.

7. The structural component assembly system of claim 1, wherein the offset for the approach vector is a non-zero offset.

8. A non-transitory computer-readable media comprising computer-readable instructions stored thereon that when executed by one or more processors associated with an assembly station cause the one or more processors to:
generate or modify an assembly sequence to assemble a structural component at the assembly station, the assembly sequence comprising one or more placement operations for each of a plurality of structural members of the structural component, each of the one or more placement operations comprising an approach vector comprising a direction and an offset;
generate project data comprising the assembly sequence; and
communicate the project data to the assembly station to place the plurality of the structural members on the assembly surface of the assembly station according to the direction and the offset of the approach vector for that structural member.

9. The non-transitory computer-readable media of claim 8, wherein the one or more processors further execute computer-readable instructions to:
determine information comprising at least one of a dimension, geometry, or cut of each one of the one or more of the plurality of structural members; and convey the information to a shaping station to allow the shaping station to shape the one or more of the plurality of structural members according to the information.

10. The non-transitory computer-readable media of claim 8, wherein the one or more processors further execute computer-readable instructions to:
   determine information about the one or more fasteners to be applied to each of the one or more of the plurality of structural members; and
   convey the information to a pre-fastening station to allow the pre-fastening station to attach the one or more fasteners to the one or more of the plurality of structural members according to the information.

11. The non-transitory computer-readable media of claim 8, wherein the one or more processors further execute computer-readable instructions to:
   determine information about the source materials needed for assembling the structural component; and
   convey the information to a bunk infeed station to allow retrieval of the source materials identified in the information.

12. The non-transitory computer-readable media of claim 8, wherein the project data further comprises one or more of member geometry, fastener geometry, or fastener to structural member association.

13. The non-transitory computer-readable media of claim 8, wherein the one or more processors further execute computer-readable instructions to:
   determine a default approach vector assigned to each of the one or more placement operations;
   receive a change in the default approach vector via a user interface; and
   update the default approach vector based on the change.

14. The non-transitory computer-readable media of claim 8, wherein the offset for the approach vector is a non-zero offset.

15. A method comprising:
   determining, by one or more processors executing computer-readable instructions stored on one or more memories, an assembly sequence to assemble a structural component at an assembly station, the assembly sequence comprising one or more placement operations for each of a plurality of structural members of the structural component, each of the one or more placement operations comprising an approach vector comprising a direction and an offset;
   generating, by the one or more processors, project data comprising the assembly sequence; and
   communicating, by the one or more processors, the project data to the assembly station to place the plurality of the structural members on the assembly surface of the assembly station according to the direction and the non-zero offset of the approach vector for that structural member.

16. The method of claim 15, further comprising:
   determining, by the one or more processors, information comprising at least one of a dimension, geometry, or cut of each one of the one or more of the plurality of structural members; and
   conveying, by the one or more processors, the information to a shaping station to allow the shaping station to shape the one or more of the plurality of structural members according to the information.

17. The method of claim 15, further comprising:
   determining, by the one or more processors, information about the one or more fasteners to be applied to each of the one or more of the plurality of structural members; and
   conveying, by the one or more processors, the information to a pre-fastening station to allow the pre-fastening station to attach the one or more fasteners to the one or more of the plurality of structural members according to the information.

18. The method of claim 15, further comprising:
   determining, by the one or more processors, information about the source materials needed for assembling the structural component; and
   conveying, by the one or more processors, the information to a bunk infeed station to allow retrieval of the source materials identified in the information.

19. The method of claim 15, wherein the project data further comprises one or more of member geometry, fastener geometry, or fastener to structural member association.

20. The method of claim 15, further comprising:
   determining, by the one or more processors, a default approach vector assigned to each of the one or more placement operations;
   receiving, by the one or more processors, a change in the default approach vector via a user interface; and
   updating, by the one or more processors, the default approach vector based on the change, wherein the offset for the approach vector is a non-zero offset.

* * * * *